(12) United States Patent
DiSalvo et al.

(10) Patent No.: US 8,139,328 B2
(45) Date of Patent: Mar. 20, 2012

(54) FAULT CIRCUIT INTERRUPTING DEVICE WITH SYMMETRICAL INPUTS

(75) Inventors: Nicholas L. DiSalvo, Levittown, NY (US); James A. Porter, Farmingdale, NY (US)

(73) Assignee: Levitron Manufacturing Company, Inc., Melville, NY (US)

( * ) Notice: Subject to any disclaimer, the term of this patent is extended or adjusted under 35 U.S.C. 154(b) by 467 days.

(21) Appl. No.: 12/275,869

(22) Filed: Nov. 21, 2008

(65) Prior Publication Data

US 2009/0128264 A1    May 21, 2009

Related U.S. Application Data

(63) Continuation-in-part of application No. 11/750,286, filed on May 17, 2007, now Pat. No. 7,558,034.

(51) Int. Cl.
*H02H 3/00* (2006.01)
*H02H 9/08* (2006.01)
*H01H 75/00* (2006.01)

(52) U.S. Cl. ............... 361/42; 361/44; 361/45; 361/46; 361/47; 361/49; 361/50; 335/6; 335/7; 335/18

(58) Field of Classification Search ............... 335/6–18; 361/42–51
See application file for complete search history.

(56) References Cited

U.S. PATENT DOCUMENTS

| | | | |
|---|---|---|---|
| 3,668,471 A | 6/1972 | Ambler et al. | |
| 4,568,997 A | 2/1986 | Bienwald et al. | |
| 5,418,678 A | 5/1995 | McDonald | |
| 5,541,800 A | 7/1996 | Misencik | |
| 5,661,623 A | 8/1997 | McDonald et al. | |
| 5,706,155 A | 1/1998 | Neiger et al. | |
| 5,729,417 A | 3/1998 | Neiger et al. | |
| 5,793,587 A | 8/1998 | Boteler | |
| 5,920,451 A * | 7/1999 | Fasano et al. | 361/45 |
| 6,052,265 A | 4/2000 | Zaretsky et al. | |
| 6,246,558 B1 | 6/2001 | DiSalvo et al. | |
| 6,417,581 B2 | 7/2002 | Hall et al. | |

(Continued)

FOREIGN PATENT DOCUMENTS

WO    WO 2004 070901    8/2004

(Continued)

OTHER PUBLICATIONS

International Search Report/Written Opinion of the International Search Authority from international application PCTUS2009/063255, dated Jun. 18, 2010; pp. 12.

(Continued)

*Primary Examiner* — Mohamad Musleh
(74) *Attorney, Agent, or Firm* — Collard & Roe, P.C.

(57) ABSTRACT

There is disclosed a circuit interrupting device with symmetrical inputs comprising a first input configured for connection to a power source or a load circuit and a second input configured for connection to a power source. There are a plurality of electrical conductors extending from the first and second inputs and a third input configured for connection to a load provided by a user. There is also a first set of transformers comprising at least one differential transformer and at least one neutral transformer connected to detect leakage current in a load circuit coupled to the first set of terminals. There is also a second set of transformers comprising at least one additional differential transformer and at least one additional neutral transformer connected to detect leakage current in a load circuit coupled to the second set of terminals.

17 Claims, 23 Drawing Sheets

U.S. PATENT DOCUMENTS

| | | | |
|---|---|---|---|
| 6,437,700 | B1 | 8/2002 | Herzfeld et al. |
| 6,522,510 | B1 | 2/2003 | Finlay et al. |
| 6,621,388 | B1 | 9/2003 | Macbeth |
| 6,657,839 | B2 | 12/2003 | de Oliveira |
| 6,693,779 | B2 | 2/2004 | DiSalvo |
| 6,724,590 | B1 | 4/2004 | Radosavljevic et al. |
| 6,771,152 | B2 | 8/2004 | Germain et al. |
| 6,807,035 | B1 | 10/2004 | Baldwin et al. |
| 6,807,036 | B2 | 10/2004 | Baldwin |
| 6,920,025 | B2 | 7/2005 | Nelson |
| 6,937,452 | B2 | 8/2005 | Chan et al. |
| 7,049,911 | B2 | 5/2006 | Germain et al. |
| 7,187,526 | B2 * | 3/2007 | DiSalvo ............ 361/42 |
| 7,196,886 | B2 | 3/2007 | Chan et al. |
| 7,375,935 | B2 | 5/2008 | Chan et al. |
| 7,542,252 | B2 | 6/2009 | Chan et al. |
| 7,800,873 | B2 * | 9/2010 | Batko et al. ............ 361/42 |
| 2004/0184207 | A1 * | 9/2004 | DiSalvo et al. .......... 361/42 |
| 2005/0030685 | A1 * | 2/2005 | DiSalvo ............ 361/42 |
| 2006/0262468 | A1 | 11/2006 | Richter et al. |
| 2006/0268472 | A1 | 11/2006 | Winch |
| 2007/0268635 | A1 | 11/2007 | Bonasia et al. |
| 2007/0274012 | A1 | 11/2007 | Bonasia et al. |
| 2008/0002313 | A1 | 1/2008 | DiSalvo et al. |
| 2009/0086389 | A1 | 4/2009 | Huang et al. |
| 2009/0086390 | A1 | 4/2009 | Huang |
| 2009/0161271 | A1 | 6/2009 | Huang et al. |
| 2009/0273866 | A1 * | 11/2009 | Chan et al. ............ 361/45 |

FOREIGN PATENT DOCUMENTS

WO    WO 2007 137180    11/2007

OTHER PUBLICATIONS

International Preliminary Report on Patentability and Written Opinion of the International Search Authority from International Application PCT/US2009/063255 dated Jun. 3, 2011.

* cited by examiner

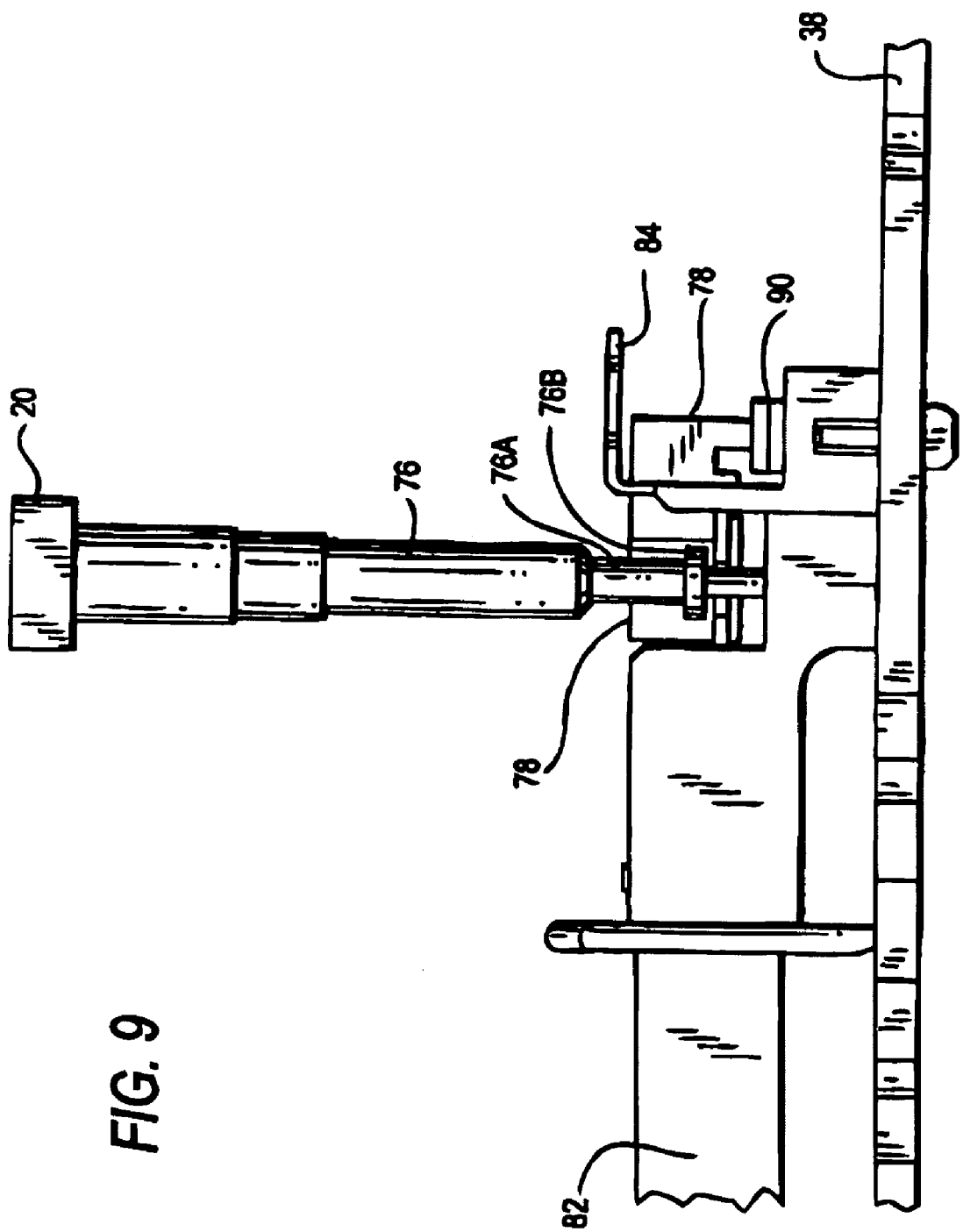

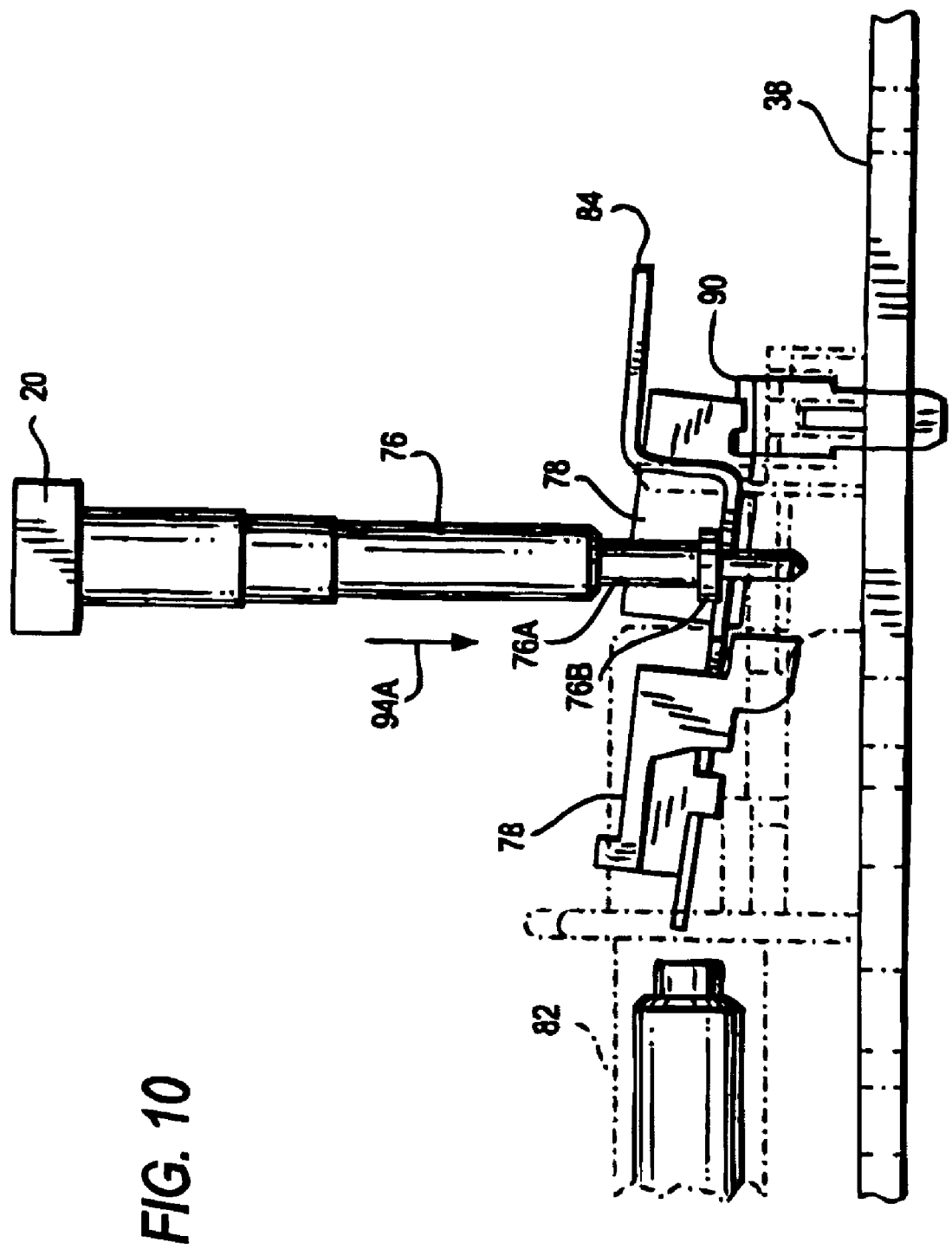

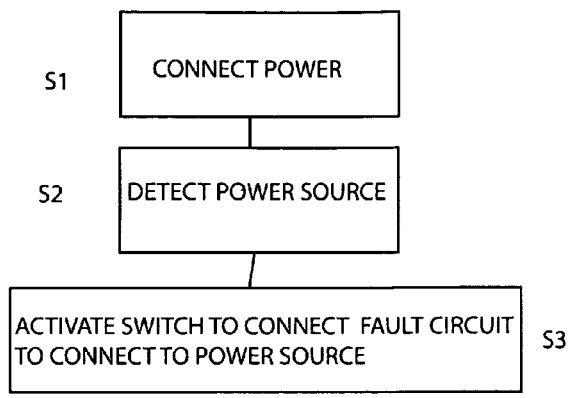
FIG. 23A
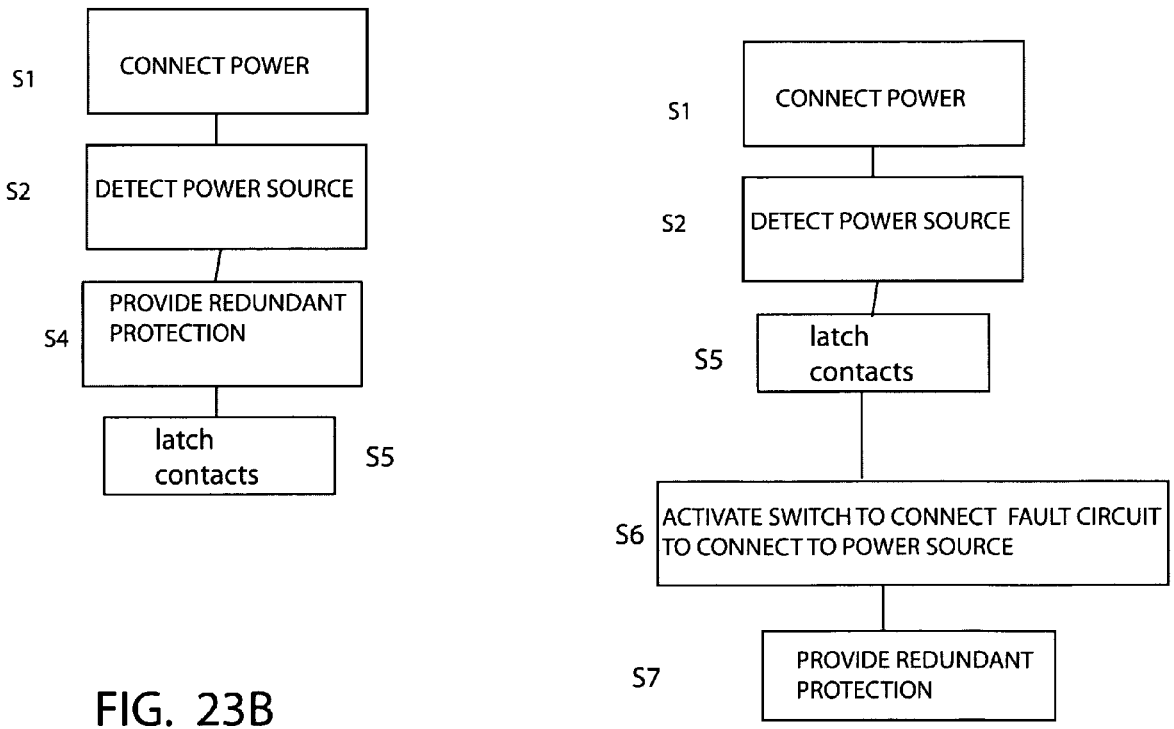
FIG. 23B
FIG. 23C

FAULT CIRCUIT INTERRUPTING DEVICE WITH SYMMETRICAL INPUTS

CROSS-REFERENCE TO RELATED APPLICATIONS

This application is a continuation in part application and hereby claims priority from U.S. patent application Ser. No. 11/750,286 filed on May 17, 2007, the disclosure of which is hereby incorporated herein by reference in its entirety.

BACKGROUND

The present invention relates to a family of resettable circuit interrupting devices that includes but is not limited to ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, the present invention provides reverse wiring ground fault protection without concern over which conductors are connected to which terminals of the resettable circuit interrupting device by providing symmetrical inputs into the fault circuit. Other fault circuits are known such as U.S. Pat. No. 6,246,558 to DiSalvo et al which issued on Jun. 12, 2001 and U.S. Pat. No. 7,049,911 to Germain et al which issued on May 23, 2006 wherein the disclosures of these fault circuits are hereby incorporated herein by reference.

SUMMARY

The present invention relates to a family of resettable circuit interrupting devices that avoid reverse wiring conditions by sensing which terminals of the circuit interrupting device, the line terminals or the load terminals, are connected to wires having input power, and latching those terminals to the line side connection of the device and the other terminals to the load side connection of the device. When the devices are in a tripped condition, no power is available to any user accessible receptacle and/or plug located on the face of the devices. Each of the devices of the present invention has at least one pair of line terminals, one pair of load terminals and one pair of face terminals. The line terminals are capable of being electrically connected to a source of power or to a load. The load terminals are capable of being electrically connected to a load or to a source of power. The face terminals are electrically connected to user accessible plugs and/or receptacles located on the face of a device. The line, load and face terminals are electrically isolated from each other. In operation, the devices of the present invention are placed in the tripped position before installing to a source of power. In a preferred inventive method of use of the device of the present invention the device is manufactured and shipped in a tripped condition, i.e., no electrical connection between line terminals and load terminals and no electrical connection between the load terminals and face terminals. Thus, in the tripped condition, at least three sets of terminals are electrically isolated from each other.

BRIEF DESCRIPTION OF THE DRAWINGS

Other objects and features of the present invention will become apparent from the following detailed description considered in connection with the accompanying drawings which disclose the different embodiments of the invention. It is to be understood, however, that the drawings are designed as an illustration only and not as a definition of the limits of the invention.

In the drawings, wherein similar reference characters denote similar elements throughout the several views:

FIGS. 9-14 show the sequence of events when the device of the present invention is reset from a tripped state;

FIG. 23A is a first flow chart for switching between two different connections;

FIG. 23B is a second flow chart for a second embodiment shown in FIGS. 19 and 21;

FIG. 23C is a third flow chart for the embodiment shown in FIGS. 20 and 22

DETAILED DESCRIPTION

Figure 1:
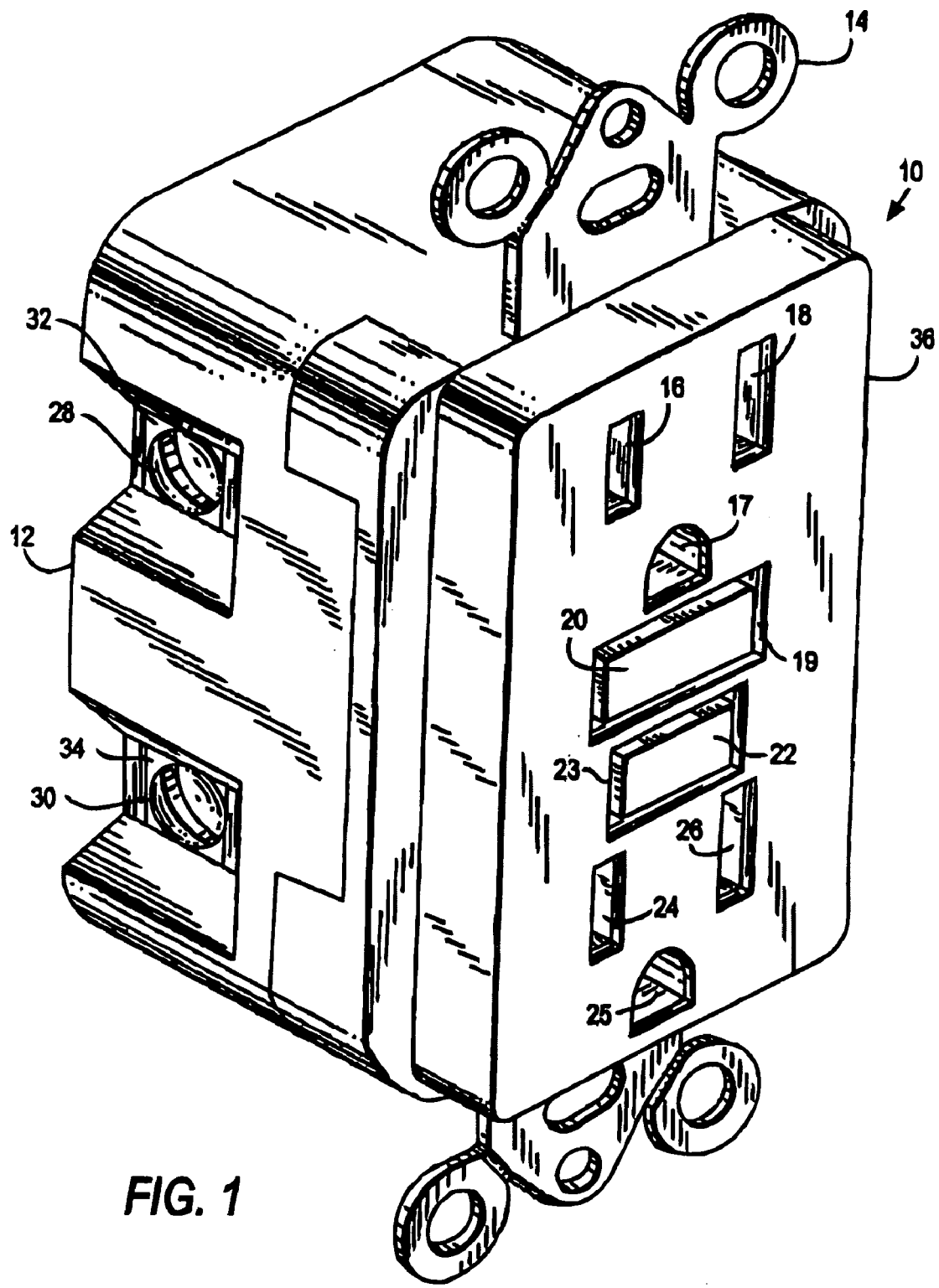
FIG. 1 is a perspective view of one embodiment of a ground fault circuit interrupting device according to the present disclosure.

The present application contemplates various types of circuit interrupting devices that have at least one conductive path. In a receptacle type circuit interrupter the conductive path is typically divided between a line side that connects to electrical power, a load side that connects to one or more loads and a user side that connects to user accessible plugs or receptacles. As noted, the various devices in the family of resettable circuit interrupting devices can comprise: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described below, are incorporated into a GFCI device suitable for installation in a single-gang electrical junction box used in, for example, a residential electrical wiring system. However, the mechanisms according to the present application can be included in any of the various devices in the family of resettable circuit interrupting devices. Further, more generally the circuit interrupting device of the present disclosure can be implemented as any device having at least a first, second, and third electrical conductor each of which is at least partially disposed in a housing. The electrical conductors are electrically isolated from each other with the first conductor capable of being connected to electrical power, the second conductor capable of being connected to one or more loads and the third conductor configured to be accessible to users. At least one pair of contacts commonly referred to as double pole single throw contacts, one end of which is connected to the source of power and the first conductor, is able to connect the first, second and third electrical conductors to each other and disconnect said conductors from each other when a fault or predetermined condition is detected.

More specifically, however, the circuit interrupting devices described herein have at least three pairs of electrically isolated terminals: at least one pair of line terminals, at least one pair of load terminals and at least one pair of user or face terminals. The at least one pair of line terminals permits electrical power (e.g., alternating current (AC)) to be connected to the device and the at least one pair of load terminals permits external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections. Alternatively, wire leads can extend from the housing for connection to the building wiring. The at least one face or user terminal, which typically is implemented using two-prong or three-prong receptacles, allows users to electrically connect electrical devices to the GFCI device typically via the two-prong or three-prong male plugs that mate with the receptacles.

The above-described features can be incorporated in any resettable circuit interrupting device, but for the sake of explanation the description to follow is directed to a GFCI device.

In one embodiment, the GFCI device has a circuit interrupter, a reset assembly, and a switching latching assembly. The device may optionally include a reset lockout mechanism. The GFCI device also has a mechanical trip portion. The GFCI device further has a pair of double pole single throw contacts that, when engaged, connect the line terminals to load and face terminals. When the double pole single throw contacts are not engaged, the line, load and face terminals are electrically isolated from each other. Because the face terminals are electrically isolated from the load and line terminals, there will be no power at the face terminals. When the double pole single throw contacts are not engaged and thus the line, load and face terminals are electrically isolated from each other, the device is said to be in a tripped condition. It is here noted that, in place of the double pole single throw contacts, movable bridge contacts can be used.

The circuit interrupting and reset portions described herein use electro-mechanical components to break (open) and make (close) one or more conductive paths between the line and load terminals of the device and also between the line and face terminals. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load terminals upon the detection of a fault, which in the embodiment described is a ground fault. Electrical continuity is also broken between the line and face terminals. The reset portion is used to close the open conductive paths.

In this configuration, the operation of the reset and reset lockout portions is in conjunction with the operation of the circuit interrupting portion, so that electrical continuity in open conductive paths cannot be reset if the circuit interrupting portion is non-operational, and/or an open neutral condition exists. When the circuit interrupting portion is non-operational—meaning that any one or more of its components is not operating properly—the device cannot be reset. The mechanical trip portion is able to break electrical continuity between the line, load and face terminals independently of the operation of the circuit interrupting portion. Thus, in the event the circuit interrupting portion is not operating properly, the device can still be tripped.

Turning now to FIG. 1, the GFCI device has a housing 12 to which a face or cover portion 36 is removably secured. The face portion 36 has entry ports or openings 16, 18, 24 and 26 aligned with receptacles for receiving normal or polarized prongs of a male plug of the type normally found at the end of a household device electrical cord (not shown), as well as ground-prong-receiving openings 17 and 25 to accommodate three-wire plugs. The GFCI device also includes a mounting strap 14 used to fasten the device to a device box.

A test button 22 extends through opening 23 in the face portion 36 of the housing 12. The test button is used to set the device 10 to a tripped condition. The circuit interrupting portion, to be described in more detail below, is used to break electrical continuity in one or more conductive paths between the line and load side of the device. A reset button 20 forming a part of the reset portion extends through opening 19 in the face portion 36 of the housing 12. The reset button is used to activate a reset operation, which reestablishes electrical continuity in the open conductive paths.

Still referring to FIG. 1, electrical connections to existing household electrical wiring are made via binding screws 28 and 30 where, for example, screw 30 is an input (or line) phase connection, and screw 28 is an output (or load) phase connection. Screws 28 and 30 are fastened (via a threaded arrangement) to terminals 32 and 34 respectively. However, as is here disclosed the GFCI device includes a switching latching circuit which permits either terminal 30 or 28 to be connected to the line and, therefore, the screw 30 can be an output phase connection and screw 28 an input phase or line connection. Terminals 32 and 34 are one half of terminal pairs. Thus, two additional binding screws and terminals (not shown) are located on the opposite side of the device 10. These additional binding screws provide line and load neutral connections, respectively. It should also be noted that the binding screws and terminals are exemplary of the types of wiring terminals that can be used to provide the electrical connections. Examples of other types of wiring terminals include set screws, pressure clamps, pressure plates, push-in type connections, pigtails and quick-connect tabs. The face terminals are implemented as receptacles configured to mate with male plugs. A detailed depiction of the face terminals is shown in FIG. 2.

Figure 2:
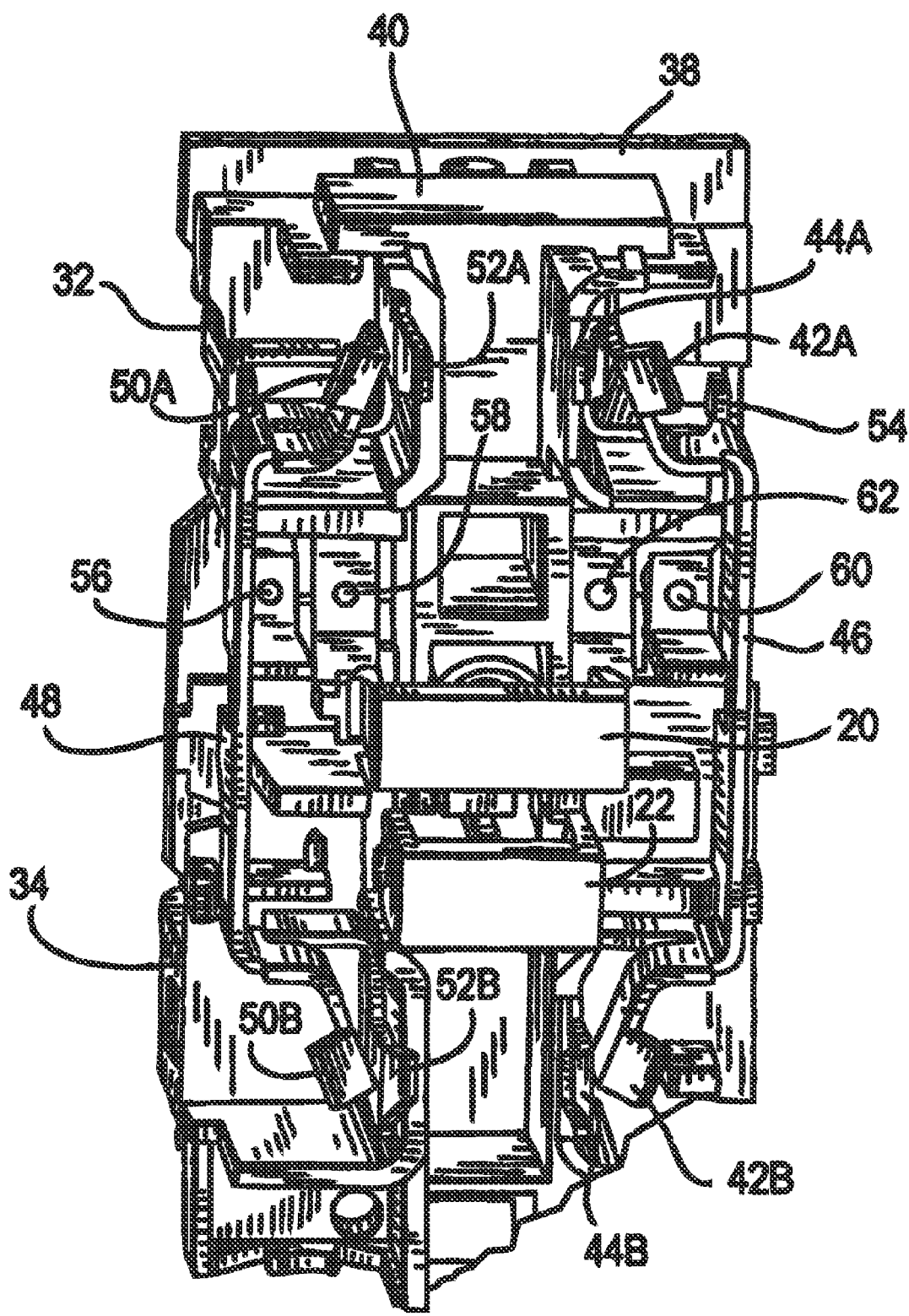
FIG. 2 is top view of a portion of the GFCI device shown in FIG. 1, with the face portion removed.

Referring to FIG. 2, a top view of the GFCI device (without face portion 36 and strap 14) is shown. An internal housing structure 40 provides the platform on which the components of the GFCI device are positioned. Reset button 20 and test button 22 are mounted on housing structure 40. Housing structure 40 is mounted on printed circuit board 38. The receptacle aligned to opening 16 of face portion 36 is made from extensions 50A and 52A of frame 48. Frame 48 is made from an electricity conducting material from which the receptacles aligned with openings 16 and 24 are formed. The receptacle aligned with opening 24 of face portion 36 is constructed from extensions 50B and 52B of frame 48. Also, frame 48 has a flange the end of which has electricity conducting contact 56 attached thereto. Frame 46 is an electricity conducting material from which receptacles aligned with openings 18 and 26 are formed. The receptacle aligned with opening 18 of frame portion 36 is constructed with frame extensions 42A and 44A. The receptacle aligned with opening 26 of face portion 36 is constructed with extensions 42B and 44B. Frame 46 has a flange the end of which has electricity conducting contact 60 attached thereto. Therefore, frames 46 and 48 form the face terminals implemented as receptacles aligned to openings 16, 18, 24 and 26 of face portion 36 of GFCI device 10 (see FIG. 1). Load terminal 32 and line terminal 34 are also mounted on internal housing structure 40. Load terminal 32 has an extension the end of which electricity conducting load contact 58 is attached. Similarly, load terminal 54 has an extension to which electricity conducting contact 62 is attached. The line, load and face terminals are electrically isolated from each other and are electrically connected to each other by a pair of movable bridges or single throw double pole switch contacts. The relationship between the line, load and face terminals and how they are connected to each other is shown in FIG. 3.

Figure 3:
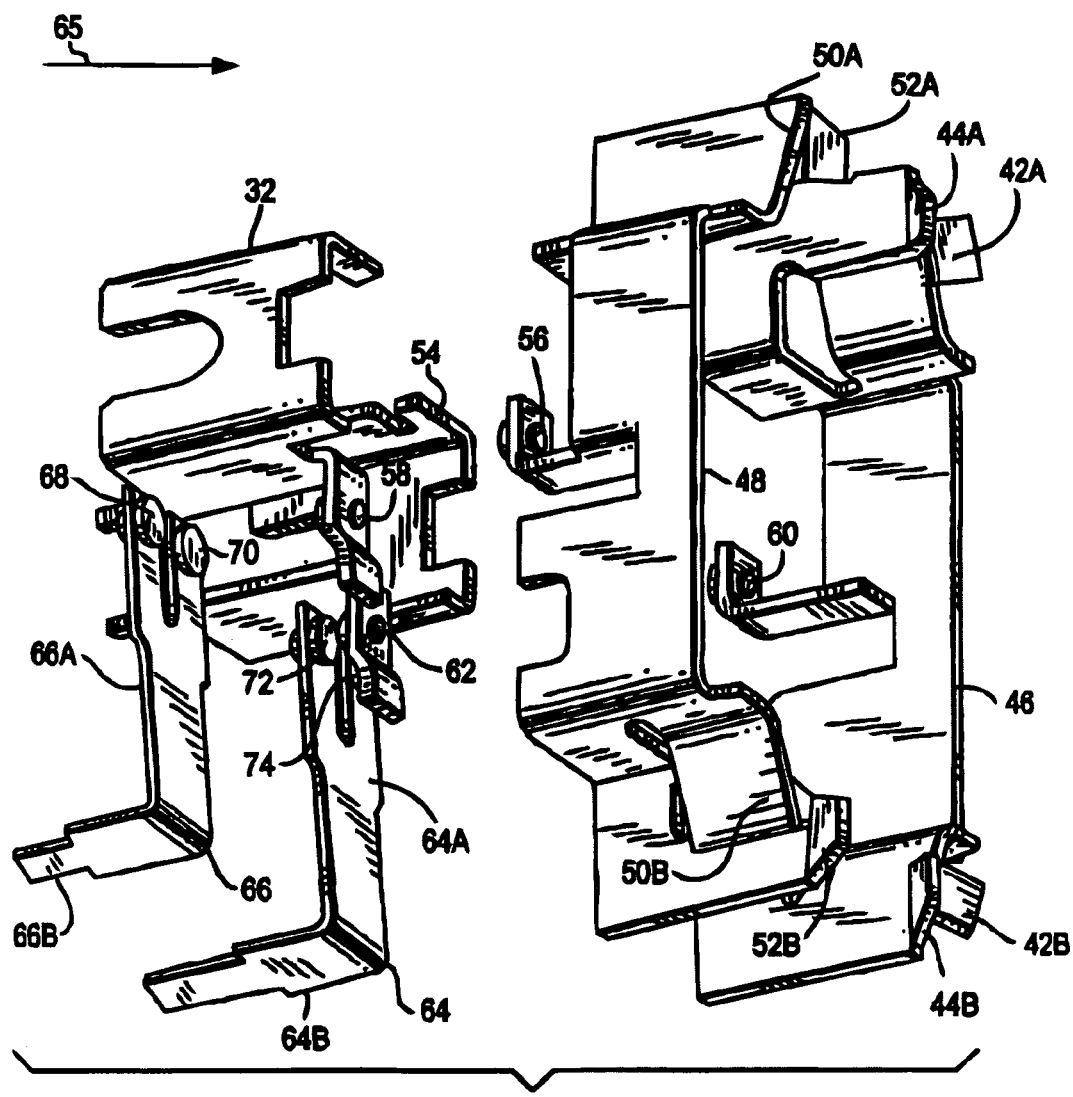
FIG. 3 is an exploded perspective view of the face terminal internal frames, the load terminals and the movable bridges.

Referring now to FIG. 3, there is shown the positioning of the face and load terminals with respect to each other and their interaction with the movable bridges (64, 66). As noted above, in place of the movable bridges, single throw double pole switch contacts can be used. Although the line terminals are not shown, it is understood that they are electrically connected to one end of the movable bridges. The movable bridges (64, 66) are generally electrical conductors that are configured and positioned to connect at least the line terminals to the load terminals. In particular movable bridge 66 has bent portion 66B and connecting portion 66A. Bent portion 66B is electrically connected to line terminal 34 (not shown). Similarly, movable bridge 64 has bent portion 64B and connecting portion 64A. Bent portion 64B is electrically connected to the other line terminal (not shown); the other line terminal being located on the side opposite that of line terminal 34. Connecting portion 66A of movable bridge 66 has two fingers each having a bridge contact (68, 70) attached to its end. Connecting portion 64A of movable bridge 64 also has two fingers each of which has a bridge contact (72, 74) attached to its end. The bridge contacts (68, 70, 72 and 74) are made from relatively highly conductive material. Also, face terminal contacts 56 and 60 are made from relatively highly conductive material. Further, the load terminal contacts 58 and 62 are made from relatively highly conductive material. The movable bridges are preferably made from flexible metal that can be bent when subjected to mechanical forces. The connecting portions (64A, 66A) of the movable bridges are mechanically biased downward or in the general direction shown by arrow 67. When the GFCI device is reset the connecting portions of the movable bridges are caused to move in the direction shown by arrow 65 and engage the load and face terminals thus connecting the line, load and face terminals to each other. In particular connecting portion 66A of movable bridge 66 is bent upward (direction shown by arrow 65) to allow contacts 68 and 70 to engage contacts 56 of frame 48 and contact 58 of load terminal 32 respectively. Similarly, connecting portion 64A of movable bridge 64 is bent upward (direction shown by arrow 65) to allow contacts 72 and 74 to engage contact 62 of load terminal 54 and contact 60 of frame 46 respectively. The connecting portions of the movable bridges are bent upwards by a latch/lifter assembly positioned underneath the connecting portions where this assembly moves in an upward direction (direction shown by arrow 65) when the GFCI is reset as will be discussed herein below with respect to FIG. 14. It should be noted that the contacts of a movable bridge engaging a contact of a load or face terminals occurs when electric current flows between the contacts; this is done by having the contacts touch each other. Some of the components that cause the connecting portions of the movable bridges to move upward are shown in FIG. 4.

Figure 4:
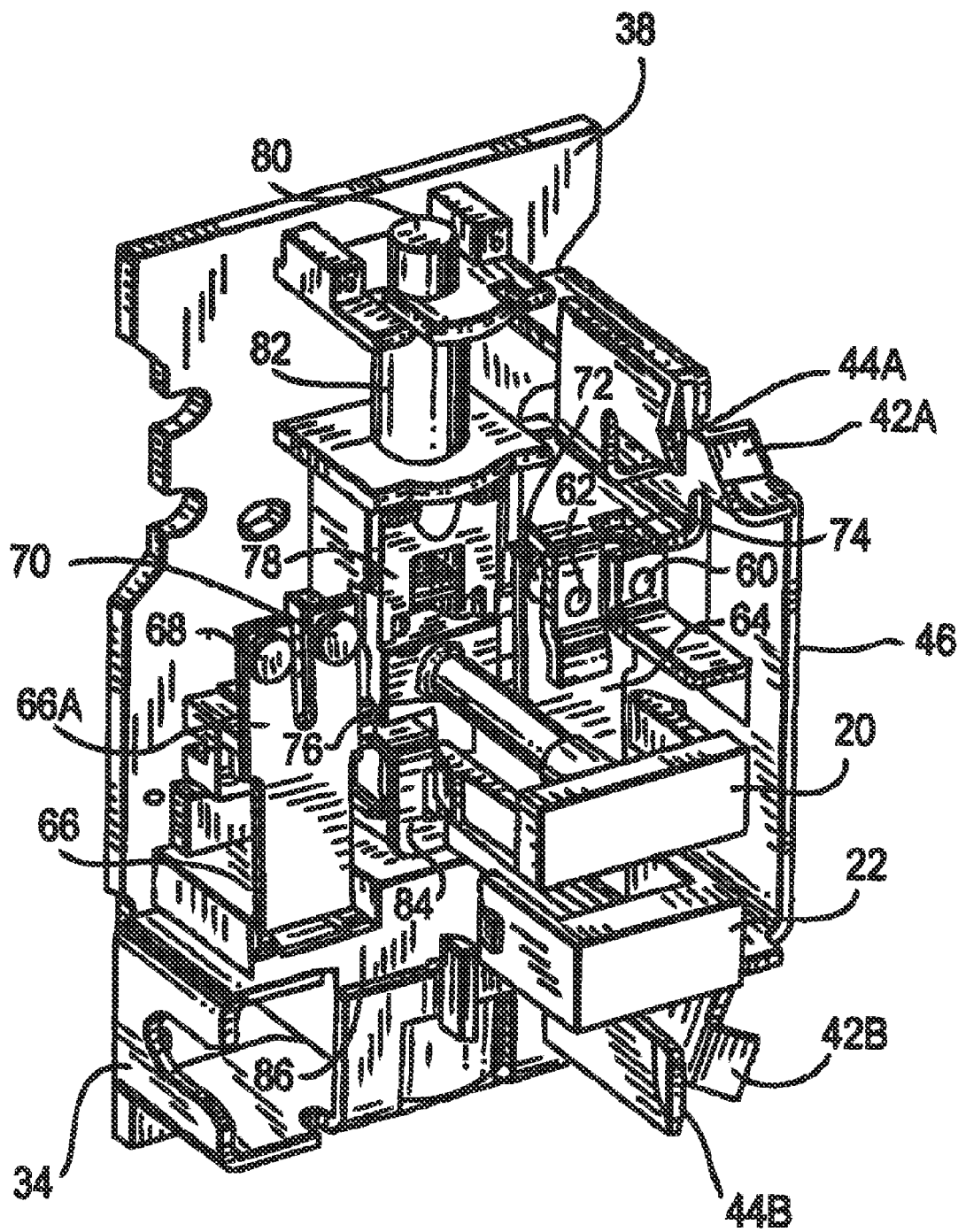
FIG. 4 is a perspective view of the arrangement of some of the components of the circuit interrupting portion of the device of the present invention.

Referring now to FIG. 4, there is shown mounted on printed circuit board 38 a solenoid with a coil plunger combination comprising bobbin 82 having a cavity in which elongated cylindrical plunger 80 is slidably disposed. For clarity of illustration frame 48 and load terminal 32 are not shown. One end of plunger 80 is shown extending outside of the bobbin cavity. The other end of plunger 80 (not shown) is coupled to or engages a spring that provides the proper force for pushing a portion of the plunger outside of the bobbin cavity after the plunger has been pulled into the cavity due to a resulting magnetic force when the coil is energized. Electrical wire (not shown) is wound around bobbin 82 to form the coil. For clarity of illustration the wire wound around bobbin 82 is not shown. A lifter 78 and latch 84 assembly is shown where the lifter 78 is positioned underneath the movable bridges. The movable bridges 66 and 64 are secured with mounting brackets 86 (only one is shown) which is also used to secure line terminal 34 and the other line terminal (not shown) to the GFCI device. It is understood that the other mounting bracket 86 used to secure movable bridge 64 is positioned directly opposite the shown mounting bracket. The reset button 20 has a reset pin 76 that engages lifter 78 and latch 84 assembly as will be shown below.

Figure 5:
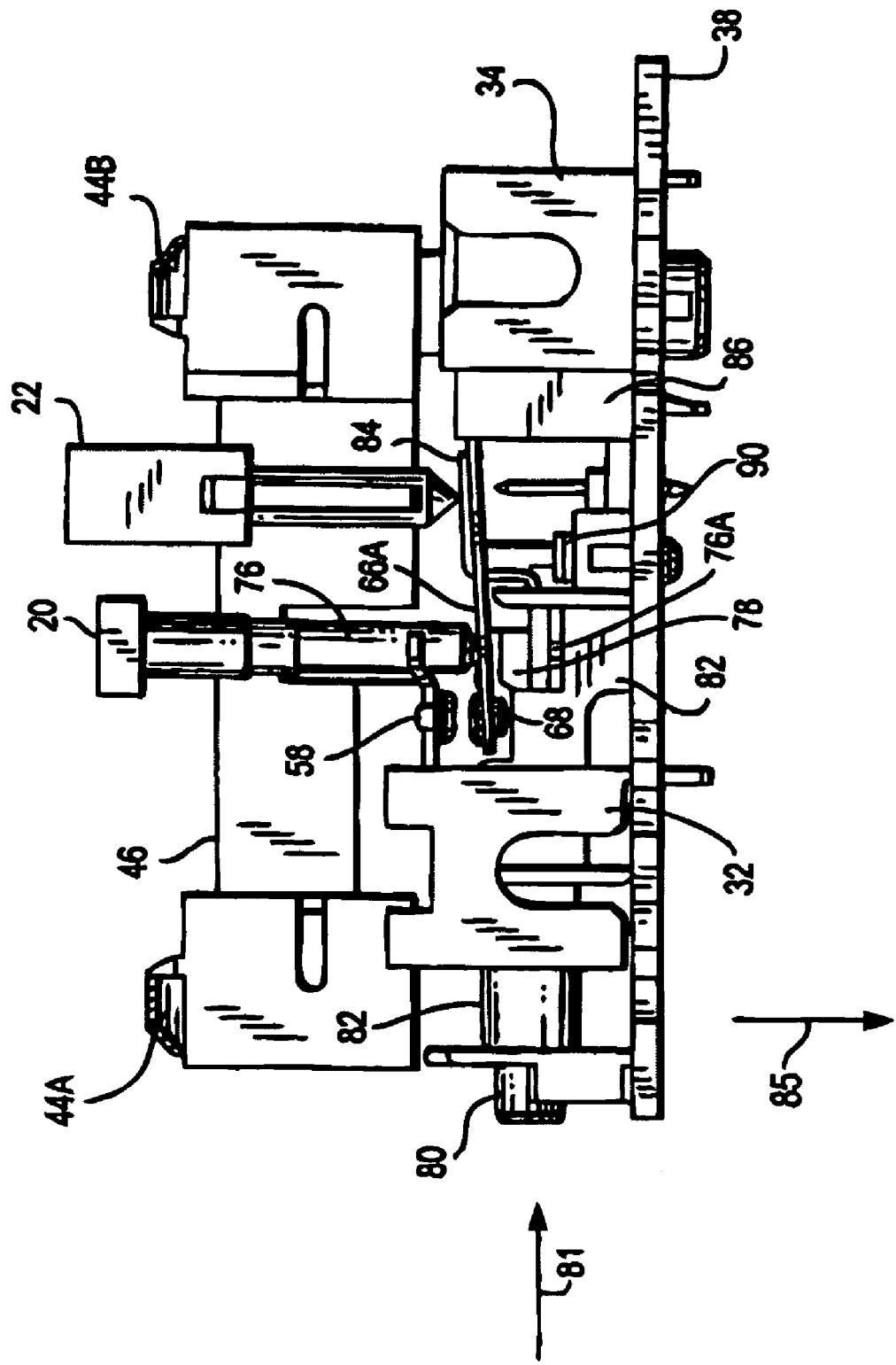
FIG. 5 is a side view of FIG. 4.

Referring now to FIG. 5, there is shown a side view of FIG. 4. When the coil is energized, plunger 80 is pulled into the coil in the direction shown by arrow 81. Connecting portion 66A of movable bridge 66 is shown biased downward (in the direction shown by arrow 85). Although not shown, connecting portion of movable bridge 64 is similarly biased. Also part of a mechanical switch—test arm 90—is shown positioned under a portion of the lifter 78. It should be noted that because frame 48 is not shown, face terminal contact 56 is also not shown.

Figure 6:
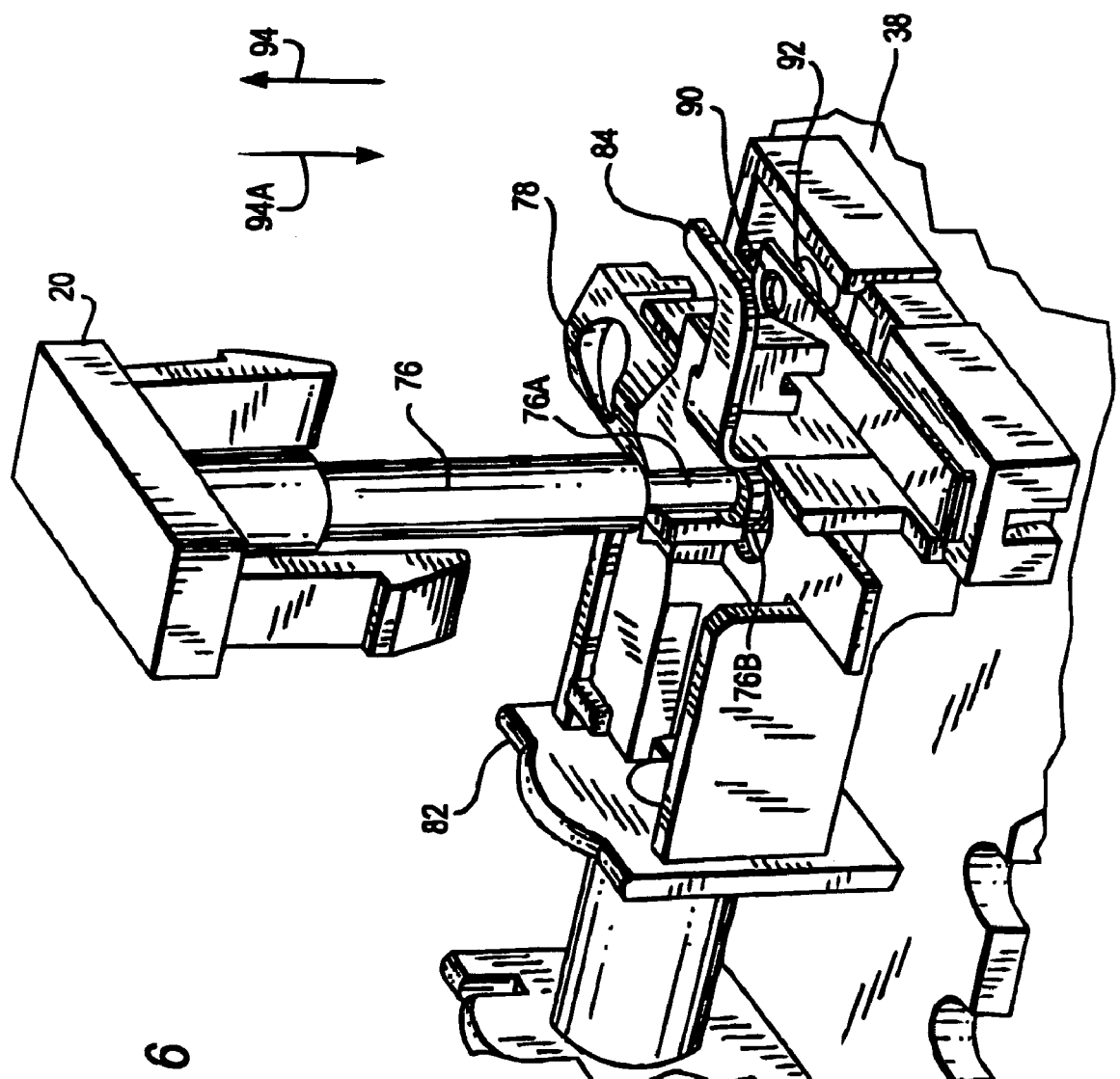
FIG. 6 is a perspective view of the reset portion of the present invention.

Referring now to FIG. 6, there is shown the positioning of the lifter 78, latch 84 assembly relative to the bobbin 82, the reset button 20 and reset pin 76. Note that the reset pin has a lower portion 76A and a disk shaped flange 76B. It should be noted that the reset pin 76 can be any shape, the disk shaped flange shown here is one particular embodiment of the type of flange that can be used. The lower portion 76A of the reset pin and flange 76B are positioned so as to extend through aligned openings of the latch 84 and lifter 78. The mechanical switch assembly is also shown positioned underneath a portion of the lifter 78. The mechanical switch assembly comprises test arm 90 and test pin 92 used to cause a trip condition to occur. The reset button 20 and reset pin 76 are biased with a spring coil (not shown) in the upward direction (direction shown by arrow 94). Test arm 90 of the mechanical switch is also biased upward. When the test arm 90 is pressed downward (direction shown by arrow 94A), it will tend to move upward (direction shown by arrow 94) to its original position when released. Similarly, when reset button 20 is depressed (in the direction shown by arrow 94A), it will return to its original position by moving in the direction shown by arrow 94. Latch plate 84 and lifter 78 assembly are mounted on top of bobbin 82. Only a portion of lifter 78 is shown so as to illustrate how lifter 78 engages test arm 90 and how latch plate 84 engages lifter 78. The specific relationship between latch plate 84 and lifter 78 is shown in FIG. 7.

Figure 7:
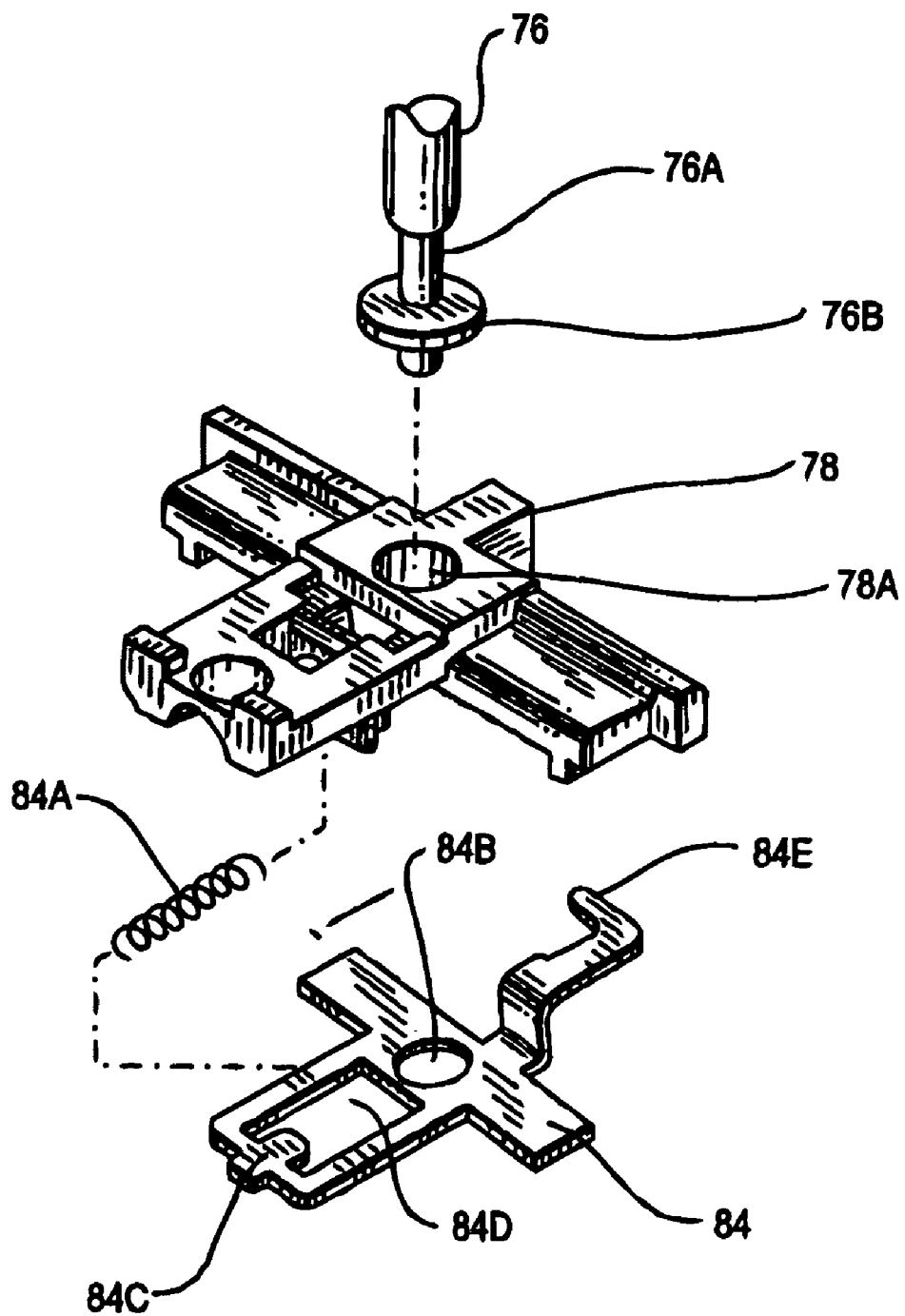
FIG. 7 is an exploded perspective view of the lifter/latch assembly of the circuit interrupting device of the present disclosure.

Referring now to FIG. 7, there is shown how the latch plate 84 is spring urged and slidably mounted to lifter 78. Latch plate 84 has an opening 84B and another opening 84D within which spring coil 84A is positioned. Latch plate stub 84C is use to receive one end of spring coil 84A and the other end of spring coil 84A engages with a detent portion of lifter 78. Latch plate 84 has a hook portion 84E used to engage test button 22 as will be discussed below with respect to FIG. 15. Although not part of the latch plate/lifter assembly, reset pin 76, with lower portion 76A and flange 76B is designed to extend through opening 78A of lifter 78 and opening 84B of latch plate 84 when the two openings are aligned to each other. The two openings become aligned with each other when the plunger 80 of the coil plunger assembly engages latch plate 84 as will be discussed herein. The plunger is caused to be pulled into the cavity of the bobbin 82 when the coil is energized by a sensing circuit when the circuit detects a fault or another predetermined condition. In the embodiment being discussed, the predetermined condition detected is a ground fault. The predetermined condition can be any type of fault such as an arc fault, equipment fault, appliance leakage fault or an immersion detection fault. Generally a fault is an indication that the circuit interrupting device has detected a dangerous condition and has or intends to disconnect power from any loads connected to the device via the load terminals and/or the face terminals. The sensing circuit and switching latching circuit is shown in FIG. 8.

Figure 8:
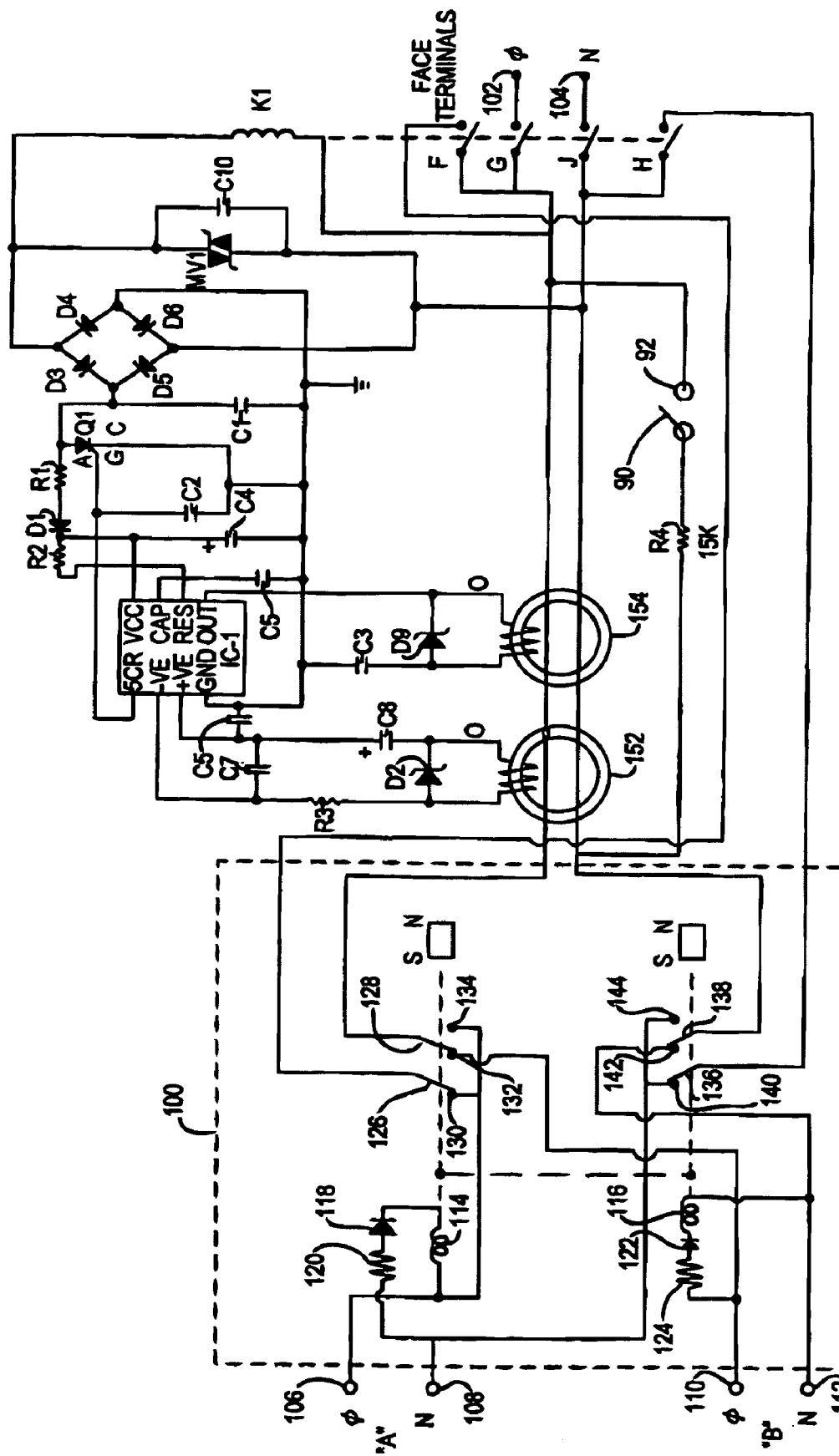
FIG. 8 is a schematic diagram of the sensing circuit and switching latching circuit for avoiding a reverse wiring condition.

Referring now to FIG. 8, the sensing circuit comprising a differential transformer, a Ground/Neutral (G/N) transformer, an integrated circuit (IC-1) for detecting current and outputting a voltage once it detects a current, a full wave bridge rectifier (D3, D4, D5, and D6), a surge suppressor (MV1) for absorbing over voltage levels that may be present at the line terminals, various filtering coupling capacitors (C1 C9), a gated semiconductor device (Q1), a relay coil assembly (K1), various current limiting resistors (R1 R4) and a voltage limiting zener diode (D2). The mechanical switch comprising test arm 90 and test pin 92 is shown connected to the conductors of the line terminals in series with current limiting resistor R4. The double pole single throw switch contacts, F and G; and, J and H, which can also be bridge terminals, connect the line terminals to the face terminals and the load terminals. The double pole, single throw switch contacts, when open, electrically isolate the line, load and face terminals of the receptacle from each other and, when closed, electrically connect the line, load and face terminals to each other. With a GFCI, when a predetermined condition occurs, such as a ground fault, a difference in current amplitude is present between the two line terminals. This current difference is manifested as a net current which is detected by the differential transformer and is fed to integrated circuit IC-1. Integrated circuit IC-1 can be any one of integrated circuits typically used in ground fault circuits (e.g., LM-1851) manufactured National Semiconductor or other well known semiconductor manufacturers. In response to the current provided by the differential transformer, integrated circuit IC-1 generates a voltage on pin 1 which is connected to the gate of Q1 and turns Q1 on. A full wave bridge comprising diodes D3-D6 has a DC side connected to the anode of Q1. When Q1 is turned on, DC from the full wave bridge activates relay K1 which causes the contacts of the double pole single throw switches to remove power from the face and load terminals of the receptacle. Relay K1 has bobbin, coil and plunger components which are coupled to move the contacts of the double pole single throw switch. Diode D1 performs a rectification function for retaining the supply voltage to IC-1 when Q1 is turned on. The relay K1 can also be activated when mechanical switch 90 is closed which causes a current imbalance on the line terminal conductors that is detected by the differential transformer. The G/N transformer detects a remote ground voltage that may be present on one of the load terminal conductors and provides a current to IC-1 upon detection of this remote ground which again activates relay K1.

The sensing circuit engages a circuit interrupting portion of the GFCI device which causes the device to be tripped. Also, the sensing circuit allows the GFCI device to be reset after it has been tripped if the reset lockout has not been activated as discussed herein below. In the tripped condition the line terminals, load terminals and face terminals are electrically isolated from each other. The GFCI here disclosed is preferably shipped in the tripped condition. The circuit interrupting portion comprises the coil and plunger (80) assembly, the latch plate (84) and lifter (78) assembly, and the mechanical switch assembly (90, 92).

With this embodiment, a switching latching circuit 100 is disclosed which prevents the GFCI being reversed wired, regardless of which screw terminals, the screw terminals for the line or the load, are connected to the line wires. With this embodiment, the wire connections to the two sets of screw terminals on the GFCI are now interchangeable. The line conductors, the conductors connected to a source of power can now be connected to either set of screw terminals on the GFCI and the load conductors can be connected to the other set of screw terminals. Regardless of how the line and load conductors are connected to the GFCI, the switching latching circuit will sense which terminals are connected to the line wires and latch the sensing circuit to those terminals to allow the GFCI to operate as designed to provide ground fault protection. The switching latching circuit 100 is located within the GFCI and, when power is applied, identifies which set of screw terminals is connected to the source of power and automatically connects that set of screw terminals to the correct set of input terminals of the GFCI receptacle.

Continuing with FIG. 8, the GFCI receptacle has a set of face terminals 102, 104 adapted to receive the blades of a plug, and a first set of screw terminals (A) 106, 108, and a second set of screw terminals (B) 110,112 located at the rear of the receptacle.

The switching latching circuit 100 includes two windings 114 and 116. Winding 114 is connected in series with a diode 118 and a resistor 120, and this series circuit is connected across rear mounted screw terminals (A) 106, 108. In a similar manner, winding 116 is connected in series with a diode 122 and a resistor 124, and this series circuit is connected across rear screw terminals (B) 110, 112. The windings 114, 116 can be continuous duty windings on two separate cores or they can be wound on a common core. The windings, together with sets of contacts can be either relays or solenoids with plunger activated contacts, and they can be either two separate relays or solenoids or a single solenoid or relay having two windings on a single core. When the relay (or solenoid) is a single relay having two separate windings, one winding urges the contacts in one direction and the other winding urges the contacts in a second direction. The relays can be of the latching type; and, if solenoids are used, permanent magnets can be use to hold the plunger in its extended or retracted position. Any relay or solenoid can be used to operate the contacts as disclosed below. For example, a single relay can have two separate windings on a common core and a plurality of contacts or two separate relays mechanically coupled to magnets or to a lever to move as one. In an embodiment which uses a solenoid having a single core and two windings, current through one winding will urge the plunger in one direction and current through the other winding will urge the plunger in a second direction. In another embodiment, a micro processor can be used to control the direction of the current through either of two coils or through a single coil. It is also understood that all or some of the components of the switching latching circuit 100 can be replaced with solid state devices such as switching transistors, flip flops and/or custom gate arrays, all or some of which can be on an IC chip.

In FIG. 8, for illustrative purposes, windings 114 and 116 are shown as being separated and coupled to separate groups of contacts. But, in the embodiment here disclosed, the winding 114,116 are located on the same core and are wound in opposite directions. Thus, when windings 116 is energized, the plunger, a single plunger which is common to both windings, causes the movable contacts 126,128, 136 and 138 to move and make contact with the stationary contacts. Therefore, when solenoid 116 is energized, movable contact 126 engages contact 130, movable contact 128 engages contact 132, movable contact 136 engages contact 140 and movable contact 138 engages contact 142. In a similar manner, when solenoid or winding 114 is energized, all of the movable contacts are urged to move to the right and movable contact 126 engages contact 132, movable contact 128 engages contact 134, movable contact 136 engages contact 142 and movable contact 138 engages contact 144. It is to be noted that stationary contact 132 is common to and is sequentially engaged by movable contacts 126 and 128; and stationary contact 142 common to and is sequentially engaged by movable contacts 136 and 138.

The plunger of the solenoid can be coupled to engage, for example, a permanent magnet or any other structure to hold the plunger in either its extended and/or retracted position. As will be explained below, when power is first applied to the GFCI receptacle, only one of the solenoids or winding 114 or 116 is energized, and it is at this time that the rear set of terminals that are connected to the source of power are first connected to be the power receiving terminals of the GFCI receptacle.

In an embodiment that uses a single winding or mechanism, structure can be provided which disconnects the winding, either winding 114 or winding 116, from the screw contact which is coupled to the source of power. One such structure can be a low wattage resistor which will burn out, a fuse element which will open or the like. This will help to latch the mechanism in the selected position. In the situation where the switching latching circuit of the GFCI has two windings and the GFCI is removed from one location where the first winding was disconnected from the circuit and is installed in another location or it is removed and reinstalled at the same location, if power is applied to the second winding of mechanism, that second winding or mechanism will reposition the contacts to properly connect the source of power to the GFCI receptacle and then disconnect itself from the source of power. Thus, with two windings, it is possible to relocate the GFCI to another location and still properly connect the GFCI to a source of power without being concerned about the GFCI being reverse wired.

Resistors 120, 122 function to limit the current to the windings and diodes 118, 122 provide DC to the windings 114, 116. Obviously, if the windings are designed to operate with AC, the diodes can be eliminated. As noted above, the resistors should be sized to burn out or open after the connected winding is energized.

Figure 8A:
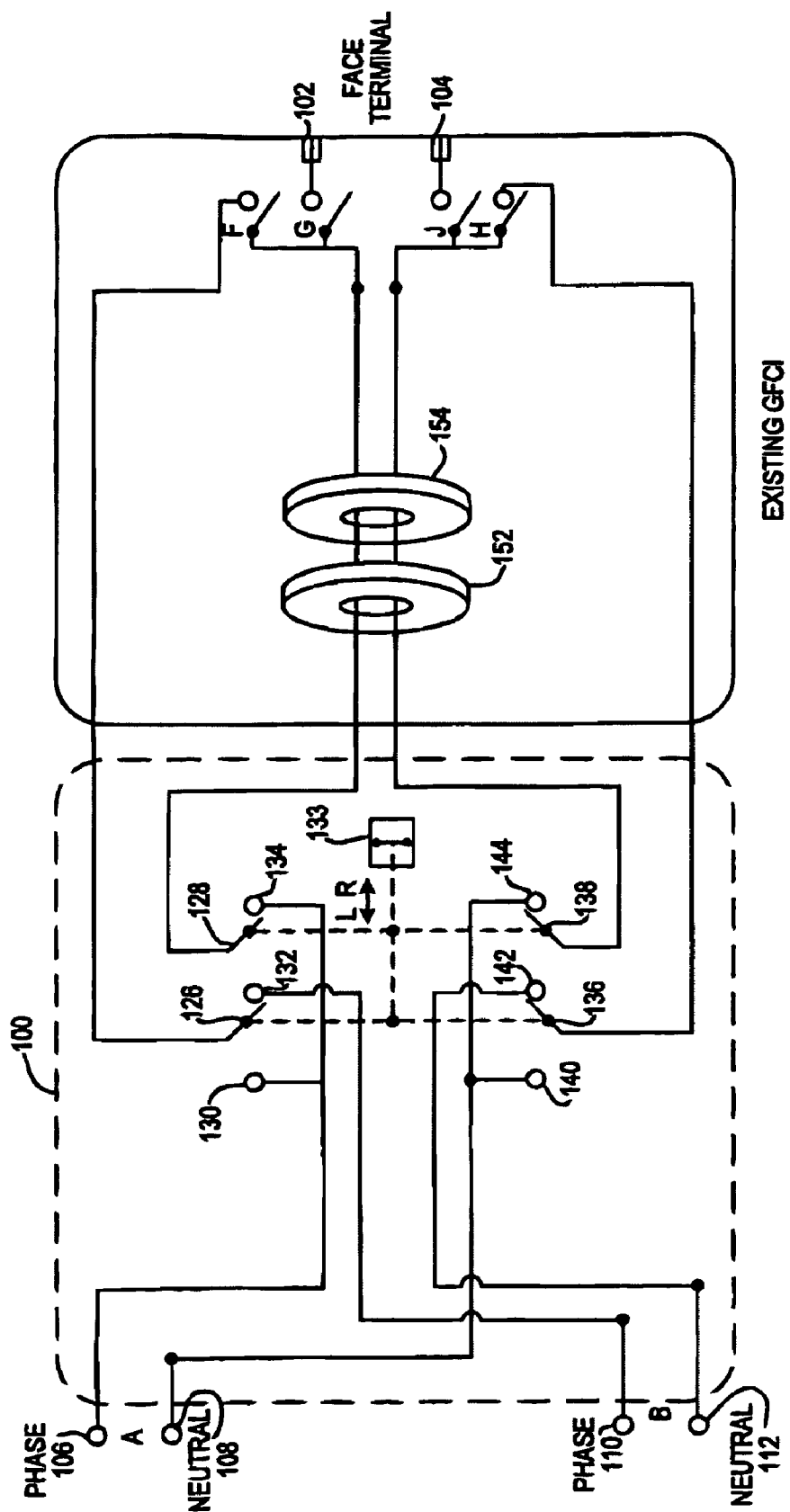
FIG. 8A is a schematic diagram of another embodiment of the sensing circuit and switching latching circuit for avoiding a reverse wiring condition.

Referring to FIG. 8A, there is shown an embodiment where the GFCI is manually operated to avoid a reverse wiring condition after the GFCI is installed and powered up. In this embodiment, a manually operated switch 133 which can be accessible from the face of the GFCI is connected to switch the movable contacts 126, 128, 136, 138 to make contact with a first or a second set of stationary contacts. Initially, an installer wires a GFCI to line and phase conductors and then turns on the power to the GFCI. It is here noted that GFCI's are normally supplied to a purchaser in its tripped state. Therefore, after the power is turned on, the installer must press the reset button on the GFCI to connect the face terminals of the GFCI and the down stream circuits to the source of power. If, when the reset button is pressed the test button pops out, power will be present at the face terminals of the GFCI and at the circuits down stream of the GFCI, and the GFCI will be properly connected. However, if the test button does not pop out, and there is no power on the face terminals and the down stream circuit, then the GFCI is reverse wired. To correct this reverse wired condition, the installer simply operates the switch 133, which is accessible at the face of the GFCI, to its other position to properly connect the GFCI to the phase and neutral line and load conductors. Now, when the installer presses of the reset button, the test button will pop out and the face terminals of the GFCI and the down stream circuits will have power.

Still referring to FIG. 8A, when the switch 133 is moved to the movable contacts 126,128, 136 and 138 move and make contact with a first set of stationary contacts. Thus, when the switch is moved, movable contact 126 engages contact 130, movable contact 128 engages contact 132, movable contact 136 engages contact 140 and movable contact 138 engages contact 142. In a similar manner, when the switch 133 is moved to the right, the movable contacts are urged to move to the right and movable contact 126 engages contact 132, movable contact 128 engages contact 134, movable contact 136 engages contact 142 and movable contact 138 engages contact 144. It is to be noted that stationary contact 132 is common to and is sequentially engaged by movable contacts 126 and 128; and stationary contact 142 common to and is sequentially engaged by movable contacts 136 and 138. Switch 133 can be a toggle type switch, a rotary switch, etc., which can be operated either directly by hand or with a tool.

In FIGS. 8 and 8A, differential transformers 152, 154 and contacts F, G, J and H are components normally found in a GFCI receptacle and their connections and operation are more fully shown and described in commonly owned U.S. Pat. No. 6,246,558 which is incorporated herein in its entirety by reference. When the GFCI receptacle is conducting, the contacts F, G, H and J are all closed. When the GFCI receptacle is tripped and, therefore, is not conducting, the contacts F, G, H and J are open.

The embodiment disclosed operates as follows. The GFCI receptacle having the switching latching circuit 100 allows either set of screw terminals, terminals A or B of the GFCI, to be connected to a source of power. The GFCI which is to be installed in a wall is supplied from the manufacturer, or from any supplier or seller in its tripped condition. That is, the contacts F, G, J and H in the GFCI are open. An installer mounts the GFCI, in its tripped condition, to a wall box and connects one set of wires to rear screw terminals (A) 106, 108; and the other set of wires to rear screw terminals (B) 110, 112. The installer need not know which of the wires being connected to the GFCI are the wires that are connected to the source of power and which set of wires are connected to down stream receptacles. After connecting the line and load wires to the GFCI receptacle, the installer energizes the circuits. For purposes of the remaining discussion, it shall be assumed that the wires connected to rear terminals (B) 110, 112 are connected to the source of power and the wires connected to the rear terminals (A) 106, 108 are connected to downstream receptacles.

With the embodiment of FIG. 8, upon energizing the circuits, a voltage is applied to terminals 110 and 112, winding 116 is energized and each of the movable contacts 136, 138, 126 and 128 are urged to move. Thus, movable contacts 136, 138 now engage fixed contacts 140, 142 respectively; and movable contacts 126, 128 now engage fixed contacts 130, 132 respectively. The phase signal on terminal 110 is fed through contacts 132, 128 and now appears on open contacts F and G. The neutral signal on terminal 112 is fed through contacts 142, 138 and now appears on open contacts H and J. As noted above, contacts F, G, H and J are open because the GFCI is placed into commerce and provided to the installer with the contacts F, G, H and J in their open condition. At some time after power is supplied to the GFCI, the resistor 124 burns out or opens and winding 116 is disconnected from the source of power. In addition, the installer will press the reset button on the face of the GFCI, the contacts F, G, H and J in the GFCI will close and the phase signal on contact F will pass through contacts 126, 130 to rear terminal 106. At the same time, the voltage on contact G will be fed to the terminal 102 at the face of the GFCI. As with the phase signal, the neutral signal from terminal 112 will now pass through contacts H and be fed through contacts 136, 140 to rear terminal 108; at the same time the neutral signal will pass through contact J to the face terminal 104 of the receptacle.

We now assume that instead of making the connections notes above, the installer connects the GFCI so that power is applied to rear terminals (A) 106, 108, and that the load wires which are connected to down stream outlets are connected to rear terminals (B) 110, 112. Remembering that when the GFCI is installed in the wall box, it is in its tripped state and, when power is first applied, winding 114 is energized and all of the movable contacts 126, 128, 136 and 138 are urged to move to the right. The phase signal on terminal 106 is fed through contacts 134, 128 to open contacts F and G, and the neutral signal on terminal 108 is fed through contacts 144, 138 to open contacts H and J. At this time, because the GFCI has not been reset, contacts F, G, H and J are open and no power is present at the rear terminals (B) or at the face terminals 102, 104 of the GFCI receptacle. Also, after a short interval of time, resistor 120 burns out or opens to disconnect winding 114 from the source of power. Subsequently, when the installer pushes the reset button on the face of the GFCI, the contacts F, G, H and J in the GFCI close and phase power will flow through closed contact F, contacts 126 and 132 to terminal 110 of rear terminals B. At the same time, phase power will flow through contacts G to contact face terminals 102 of the face terminals. In a similar manner, closed contact H connects the neutral terminal 108 through closed contacts 136 and 142 to the neutral terminal 112 of rear terminals B; and closed contact J connects neutral terminal 112 to face terminal 104.

As noted above, with the embodiment of FIG. 8A, if the GFCI is reversed wired, the installer simply moves the switch 133 to its other position to eliminate the reverse wiring condition.

Referring to FIGS. 9-14, there is shown a sequence of how the GFCI is reset from a tripped condition. When the GFCI device is in a tripped condition, the line, load and face terminals are electrically isolated from each other because the movable bridges are not engaged to any of the terminals. Referring to FIG. 9 there is shown the positioning of the reset button 20, reset pin 76, reset pin lower portion 76A and disk 76B when the device is in the tripped condition. In the tripped condition, the lifter 78 positioned below the movable bridges (not shown) does not engage the movable bridges. Reset button 20 is in its fully up position. Latch 84 and lifter 78 are such that the openings of the latch 84 and the lifter 78 are misaligned, not allowing disk or flange 76B to go through the openings. Also a portion of lifter 78 is positioned directly above test arm 90 but does not engage test arm 90.

In FIG. 10, to initiate the resetting of the GFCI device, reset button 20 is depressed (in the direction shown by 94A) causing flange 76B to interfere with latch plate 84 as shown which causes lifter 78 to press down on test arm 90 of the mechanical switch. As a result, test arm 90 makes contact with test pin 92 (see FIG. 6).

Figure 11:
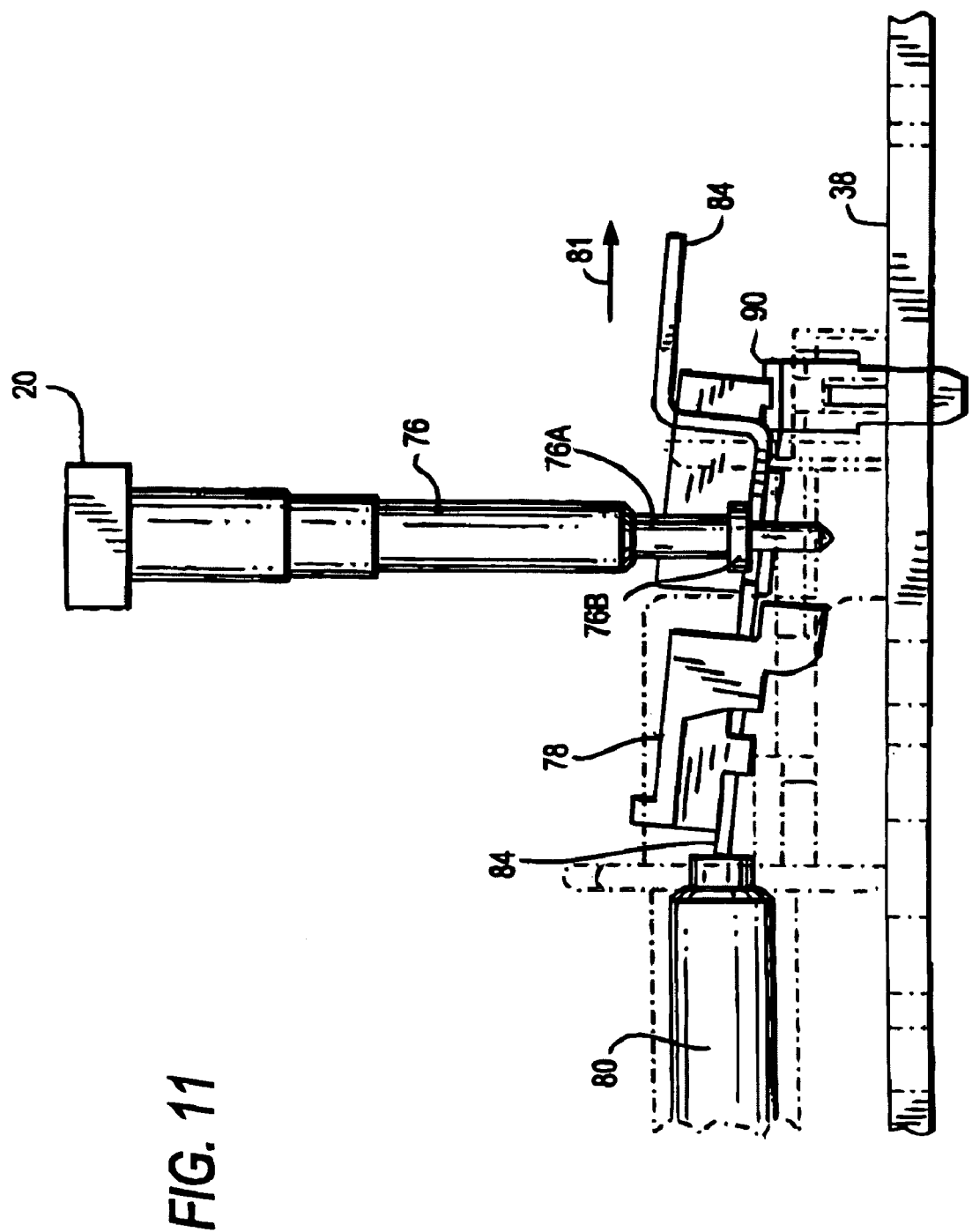

In FIG. 11, when test arm 90 makes contact with test pin 92, the sensing circuit is triggered as explained above, energizing the coil causing plunger 80 to be momentarily pulled into the bobbin 82 engaging latch plate 84 and more specifically pushing momentarily latch plate 84 in the direction shown by arrow 81.

Figure 12:
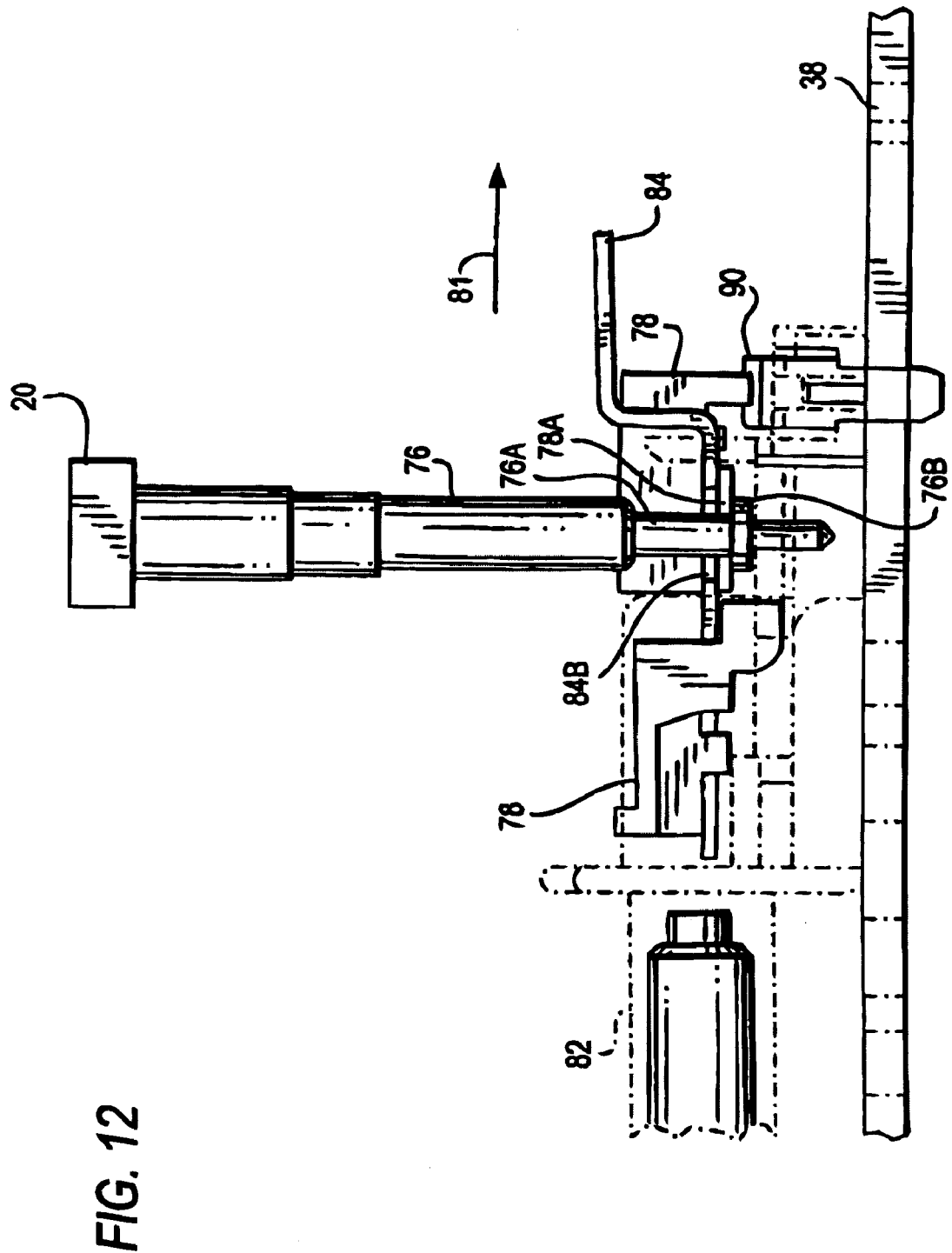

In FIG. 12, the latch plate, when pushed by plunger 80, slides along lifter 78 (in the direction shown by arrow 81) so as to align its opening with the lifter opening allowing flange 76B and part of lower reset pin portion 76A to extend through the openings 84B, 78A (see FIG. 7).

Figure 13:
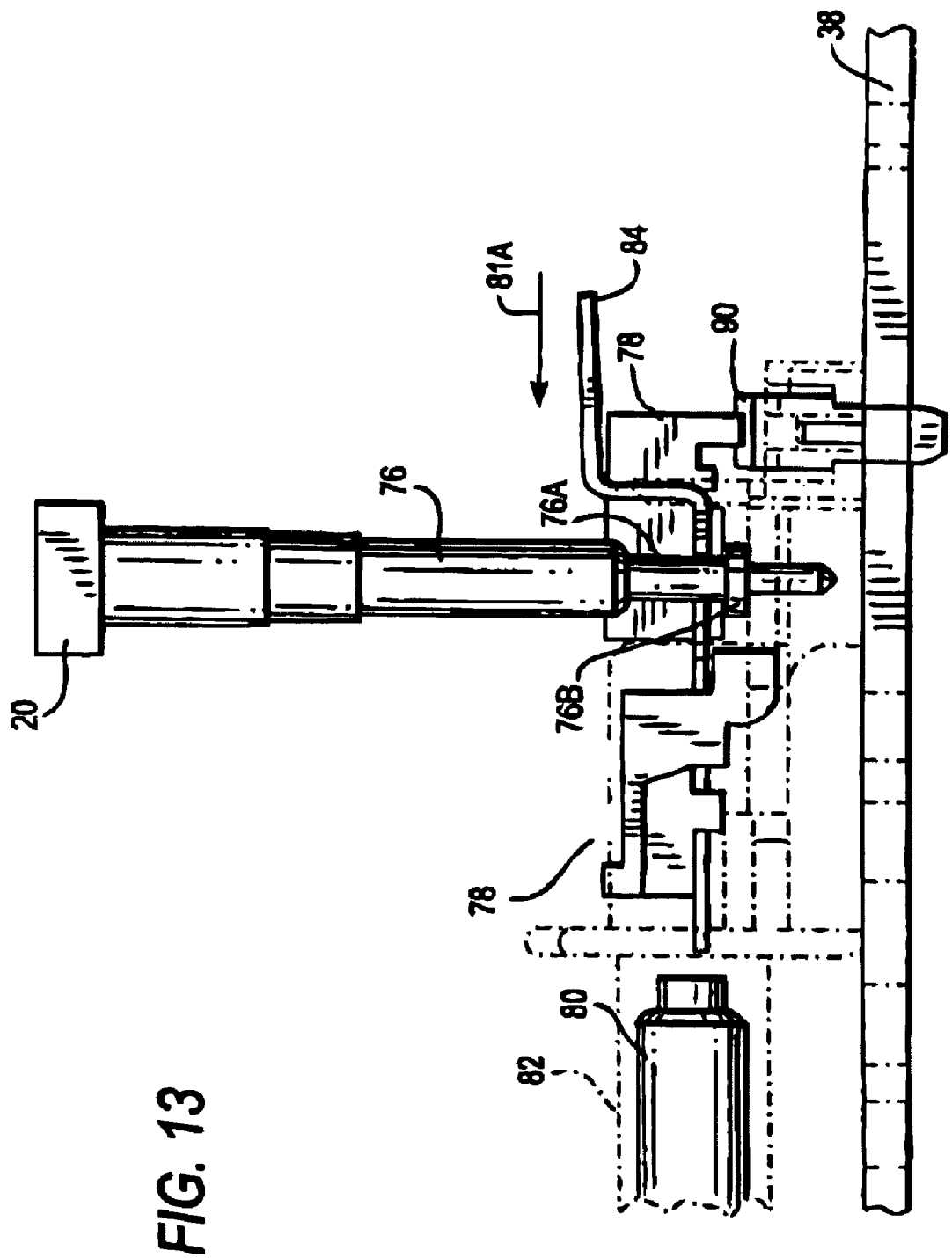
Figure 14:
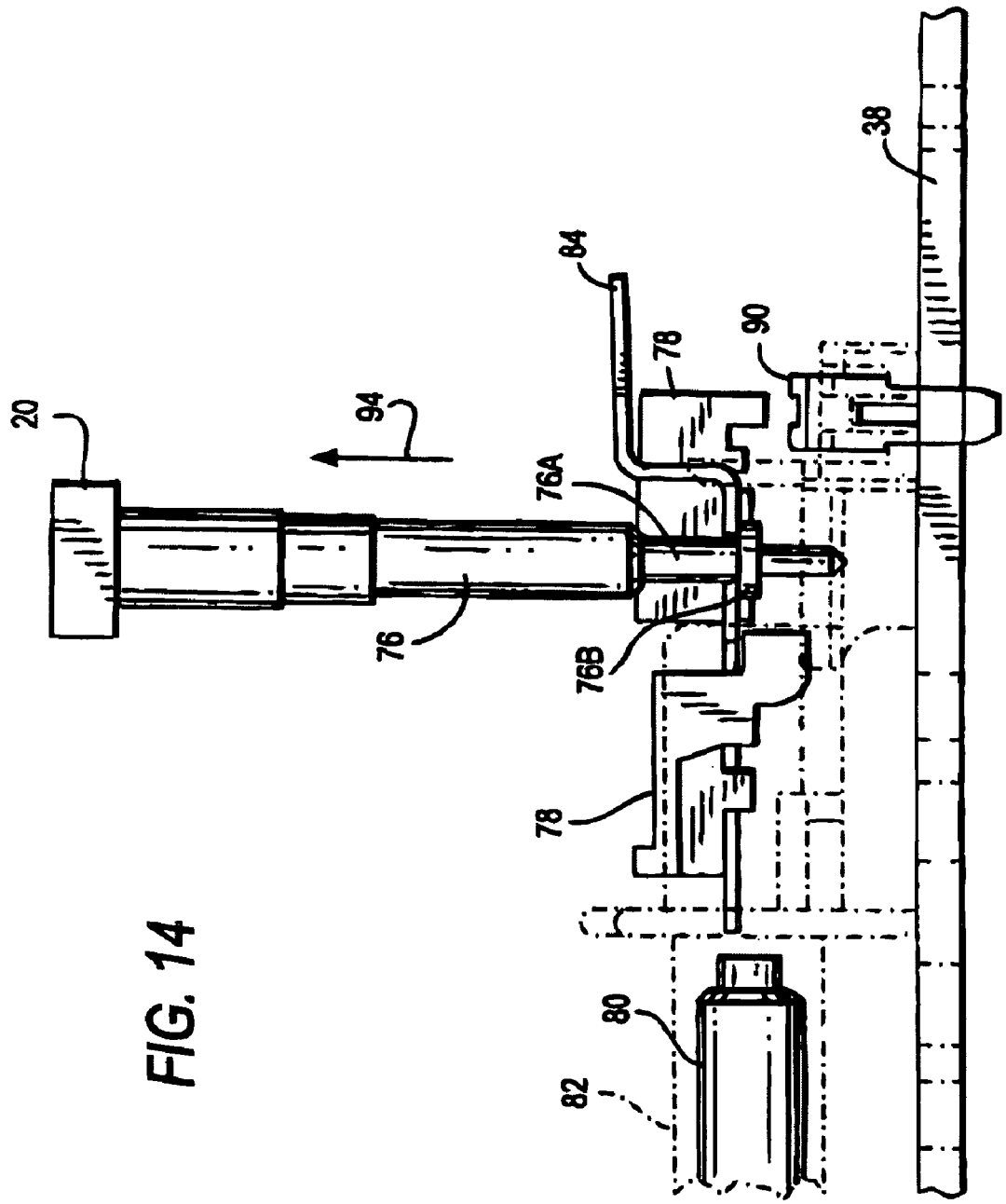

In FIG. 13, the latch plate then recoils back (in the direction shown by arrow 81A) and upon release of the reset button, test arm 90 also springs back disengaging from test pin 92. In FIG. 14, the recoiling of the latch plate 84 causes the opening 84B to once again be misaligned with opening 74A thus trapping flange 76B underneath the lifter 78 and latch assembly. When reset button is released the biasing of the reset pin 76 in concert with the trapped flange 76B raise the lifter and latch assembly causing the lifter (located underneath the movable bridges) to engage the movable bridges 66, 64. In particular, the connecting portions (66A, 64A) of the movable bridges 66 and 64 respectively are bent in the direction shown by arrow 65 (see FIG. 3 and corresponding discussion supra) resulting in the line terminals, load terminals and face terminals being electrically connected to each other. When the button is released, the contacts move into a latched position via the direction of arrow 94 shown in FIG. 14. The GFCI is now in the reset mode meaning that the electrical contacts of the line, load and face terminals are all electrically connected to each other allowing power from the line terminal to be provided to the load and face terminals. The GFCI will remain in the reset mode until the sensing circuit detects a fault or the GFCI is tripped purposely by depressing the test button 22.

When the sensing circuit detects a condition such as a ground fault for a GFCI or other conditions (e.g., arc fault, immersion detection fault, appliance leakage fault, equipment leakage fault), the sensing circuit energizes the coil causing the plunger 80 to engage the latch 84 resulting in the latch opening 84B being aligned with the lifter opening 78A allowing the lower portion of the reset pin 76A and the disk flange 76B to escape from underneath the lifter causing the lifter to disengage from the double pole single throw switch contacts or movable bridges 64, 66 which, due to their biasing, move away from the face terminals contacts and load terminal contacts. As a result, the line, load and face terminals are electrically isolated from each other and thus the GFCI device is in a tripped state or condition (see FIG. 9).

Figure 15:
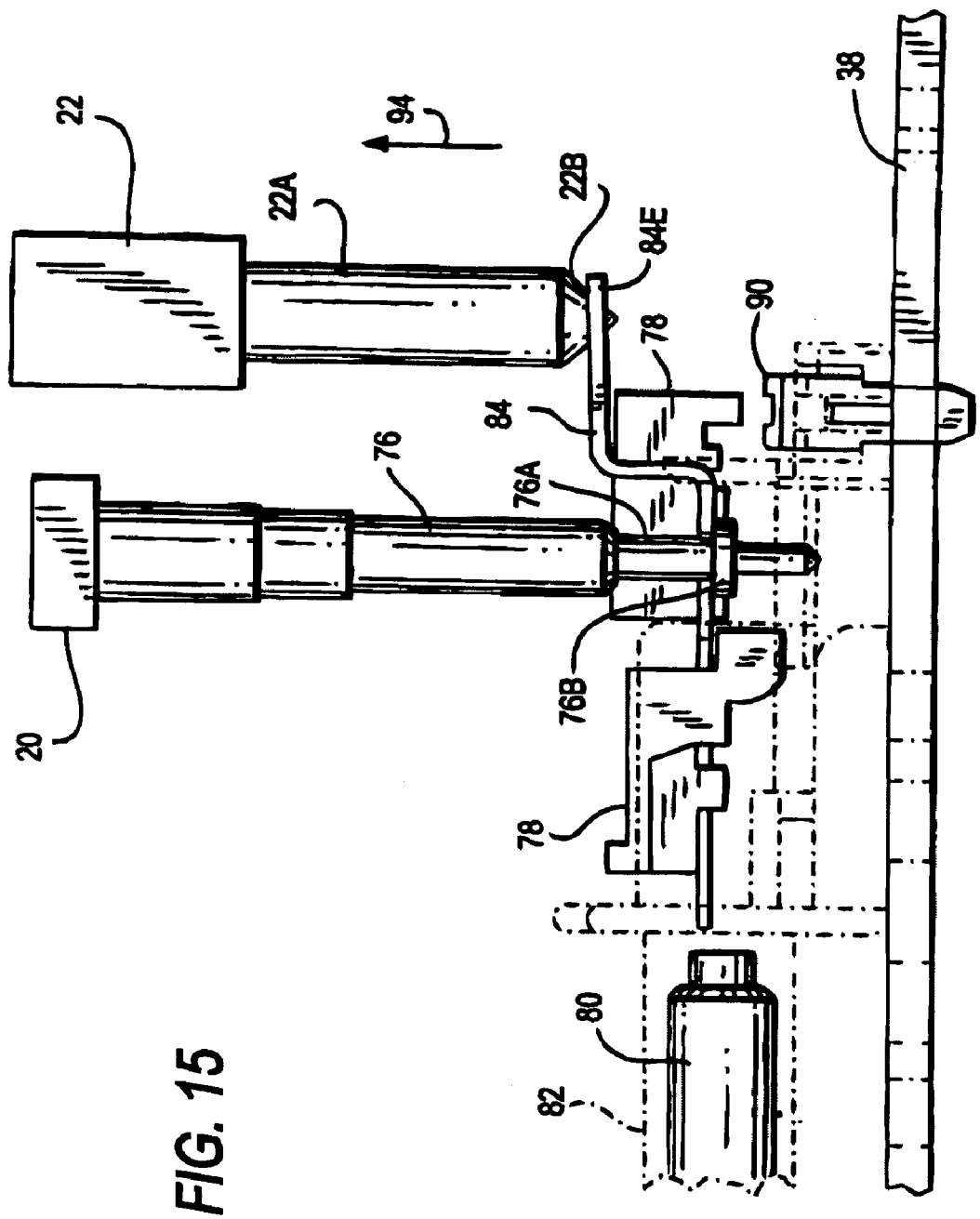
FIGS. 15-18 show the sequence of events when the device of the present invention is tripped while in a reset state.

The GFCI device of the present embodiment can also enter the tripped state by pressing the test button 22. In FIGS. 15-18, there is illustrated a sequence of operation showing how the device can be tripped using the test button 22. In FIG. 15, while the device is in the reset mode, test button 22 is depressed. Test button 22 has test button pin portion 22A and cam end portion 22B connected thereto and is mechanically biased upward in the direction shown by arrow 94. The cam end portion 22B is preferably conically shaped so that when it engages with the hooked end 84E of latch plate 84 a cam action occurs due to the angle of the end portion of the test button pin 22A.

Figure 16:
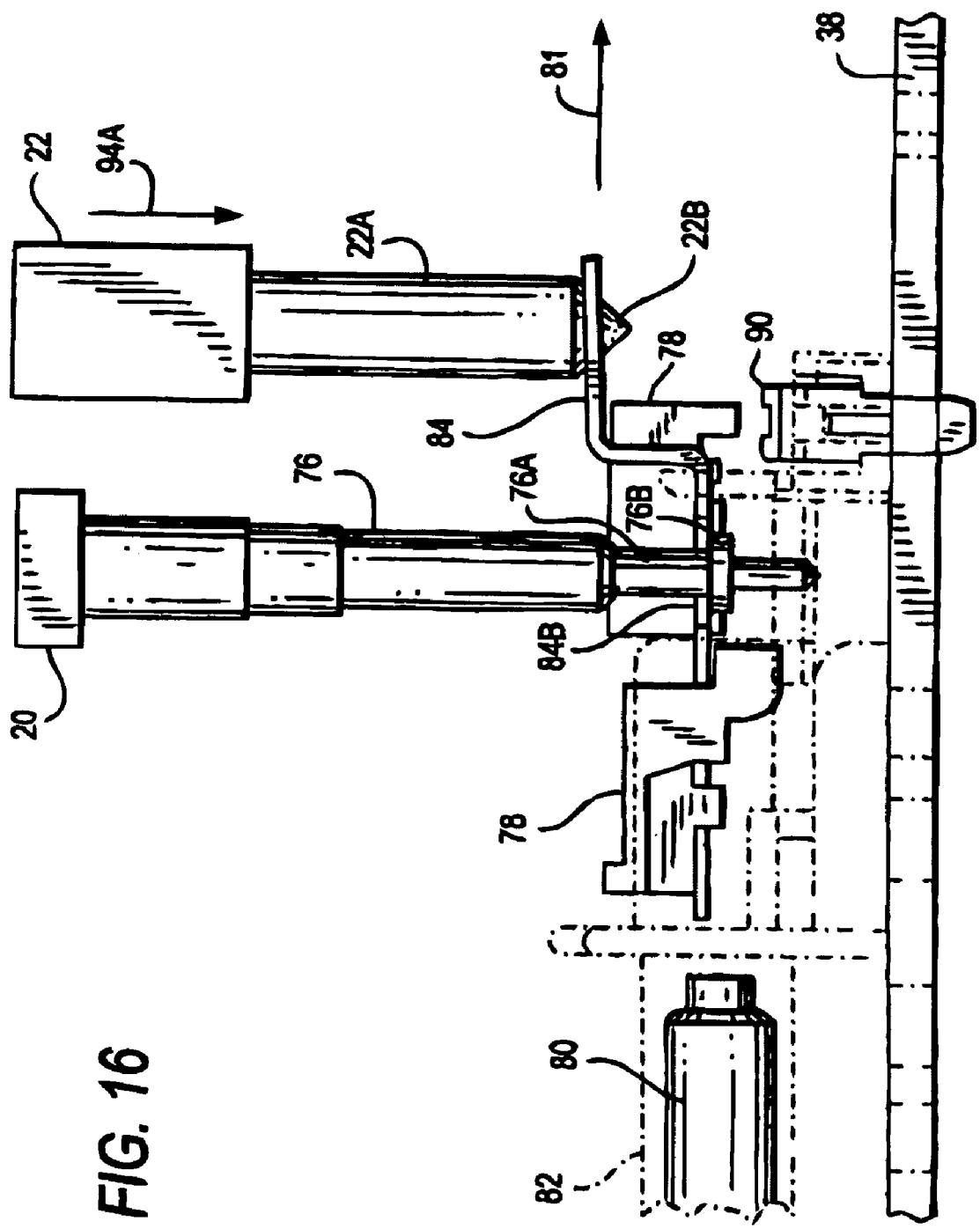

In FIG. 16, the cam action is the movement of latch plate 84 in the direction shown by arrow 81 as test button 22 is pushed down (direction shown by arrow 94A) causing latch plate opening 84B to be aligned with lifter opening 78A.

Figure 17:
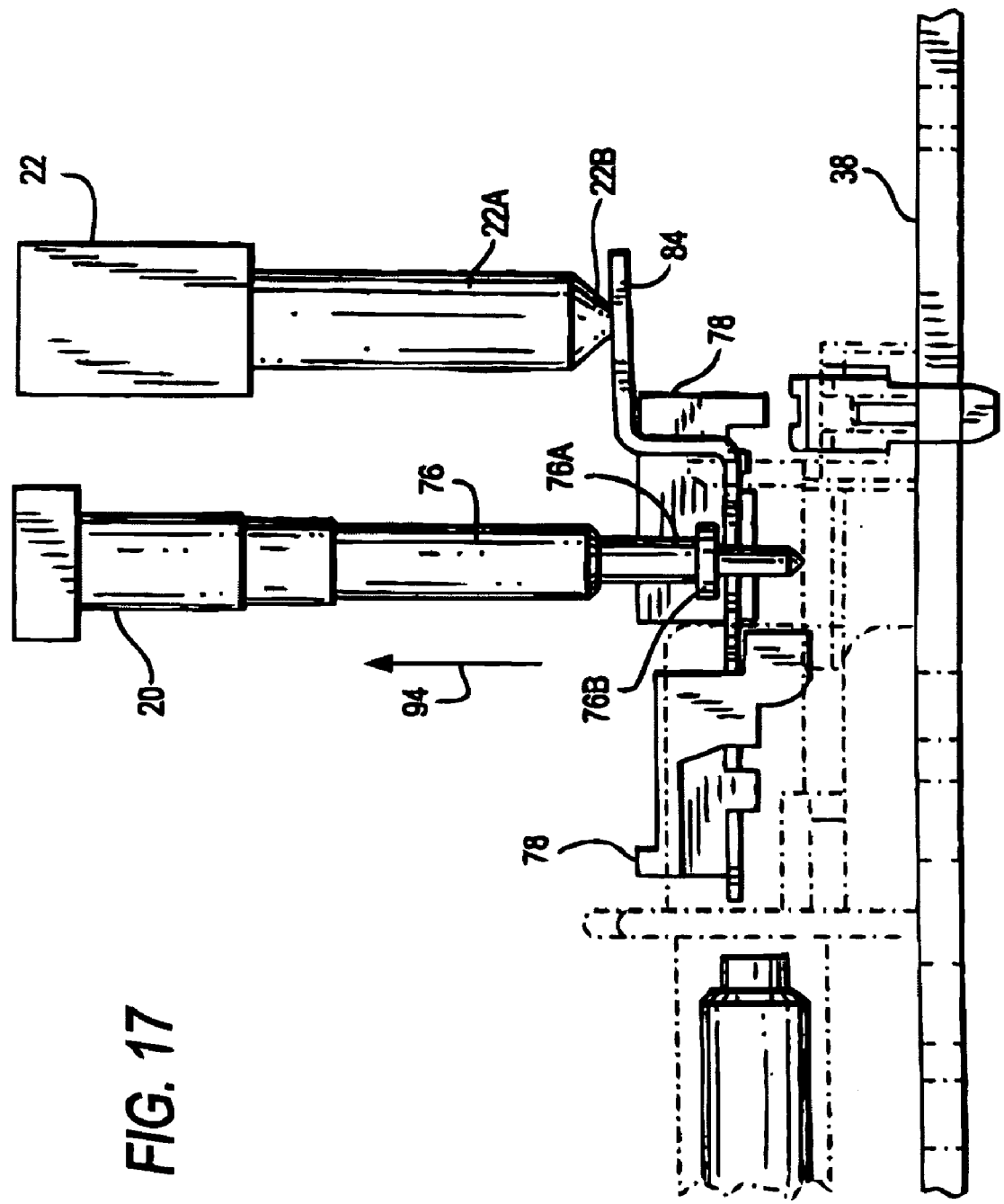
Figure 18:
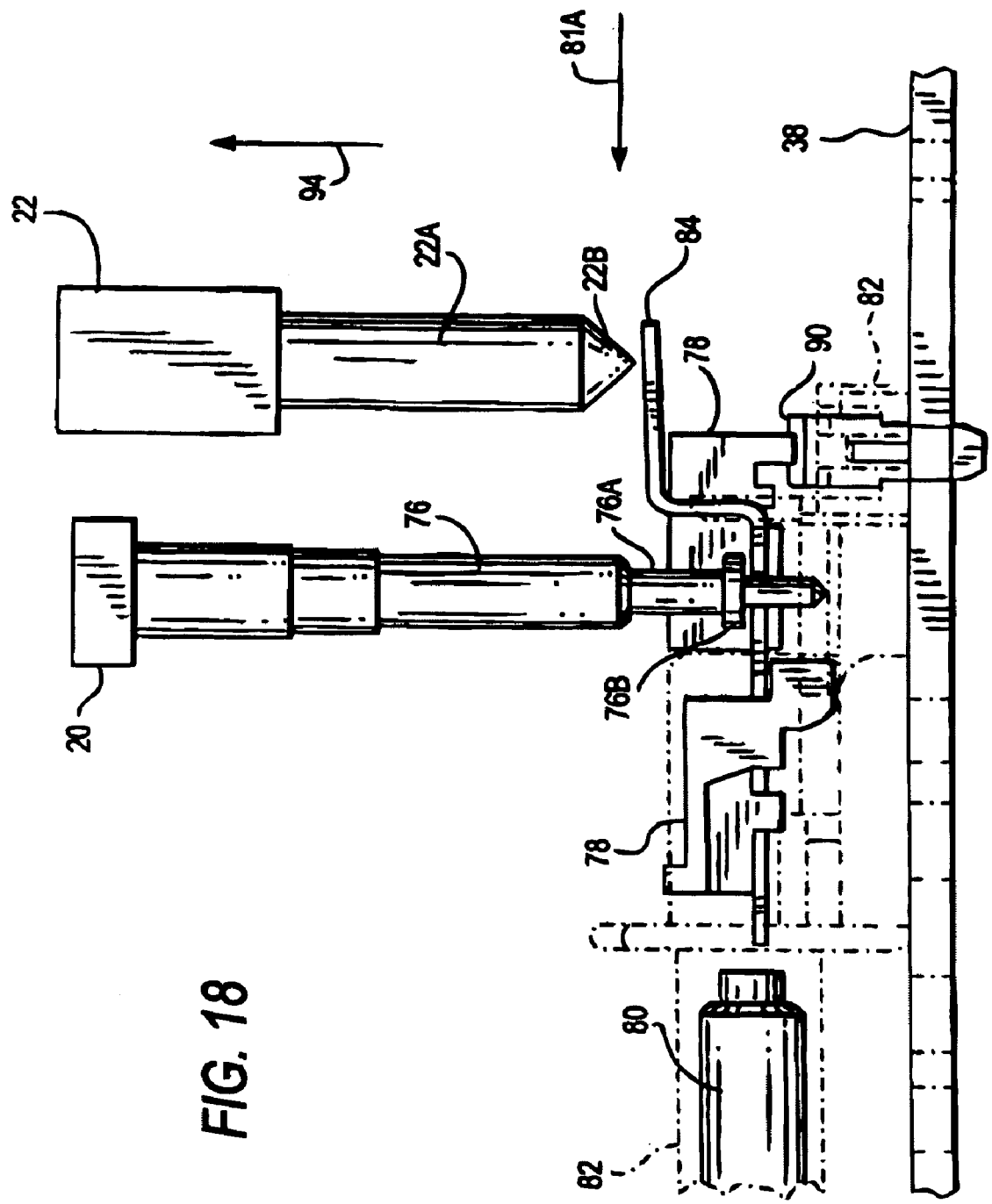

In FIG. 17, the alignment of the openings (78A, 84B) allows the lower portion of the reset pin 76A and the disk flange 76B to escape from underneath the lifter causing the lifter to disengage from the movable bridges 64, 66 which, due to their biasing, move away from the face terminals contacts and load terminal contacts (see FIG. 3). The test button 22 is now in a fully up position. As a result, the line, load and face terminals are electrically isolated from each other and thus the GFCI device is in a tripped state or condition (see FIG. 9). In FIG. 18, the test button 22 is released allowing its bias to move it upward (direction shown by arrow 94) and disengage from the hook portion 84E of latch plate 84. The latch plate recoils in the direction shown by arrow 81A thus causing the opening in the latch plate 84 to be misaligned with the opening of the lifter 78. The device is now in the tripped position. It should be noted that once the device of the present invention is in a tripped position, depressing the test button will not perform any function because at this point the latch 84 cannot be engaged by the angled end of the test button 22. The test button 22 will perform the trip function after the device has been reset.

The GFCI device of the present embodiment once in the tripped position will not be allowed to be reset (by pushing the reset button) if the circuit interrupting portion is non-operational; that is if any one or more of the components of the circuit interrupting portion is not operating properly, the device cannot be reset. Further, if the sensing circuit is not operating properly, the device can not be reset. The reset lockout mechanism of the present invention can be implemented in an affirmative manner where one or more components specifically designed for a reset lockout function are arranged so as to prevent the device from being reset if the circuit interrupting portion or if the sensing circuit are not operating properly. The reset lockout mechanism can also be implemented in a passive manner where the device will not enter the reset mode if any one or more of the components of the sensing circuit or if any one or more of the components of the circuit interrupting portion is not operating properly; this passive reset lockout approach is implemented in the present embodiment. For example, if anyone of the following components is not operating properly or has a malfunction—i.e., the coil/plunger assembly (82,80) or the latch plate/lifter assembly (84,78) or the reset button/reset pin (22,76) the device cannot be reset. Further if the test arm (90) or test pin (92) is not operating properly, the device cannot be reset.

It should be noted that the circuit interrupting device of the present embodiment has a trip assembly that operates independently of the circuit interrupting portion so that in the event the circuit interrupting portion becomes non-operational the device can still be tripped. Preferably, the trip portion is manually activated as discussed above (by pushing test button 22) and uses mechanical components to break one or more conductive paths. However, the trip portion may use electrical circuitry and/or electromechanical components to break either the phase or neutral conductive path or both paths.

Although the components used during circuit interrupting and device reset operations are electromechanical in nature, the present application also contemplates using electrical components, such as solid state switches and supporting circuitry, as well as other types of components capable or making and breaking electrical continuity in the conductive path.

It should also be noted that the circuit interrupting device of the present embodiment can be part of a system comprising one or more circuits routed through a house, for example, or through any other well known structure. Thus, the system of the present embodiment is configured with electricity conducting media (e.g., electrical wire for carrying electrical current) that form at least one circuit comprising at least one circuit interrupting device of the present embodiment, electrical devices, electrical systems and/or components; that is, electrical components, electrical devices and or systems can be interconnected with electrical wiring forming a circuit which also includes the circuit interrupting device of the present embodiment. The formed circuit is the system of the present embodiment to which electrical power is provided. The system of the present embodiment can thus protect its components, systems, or electrical devices by disconnecting them from power if the circuit interrupting device has detected a fault (or predetermined condition) from any one of them. In one embodiment, the circuit interrupting device used in the system can be a GFCI.

Figure 19:
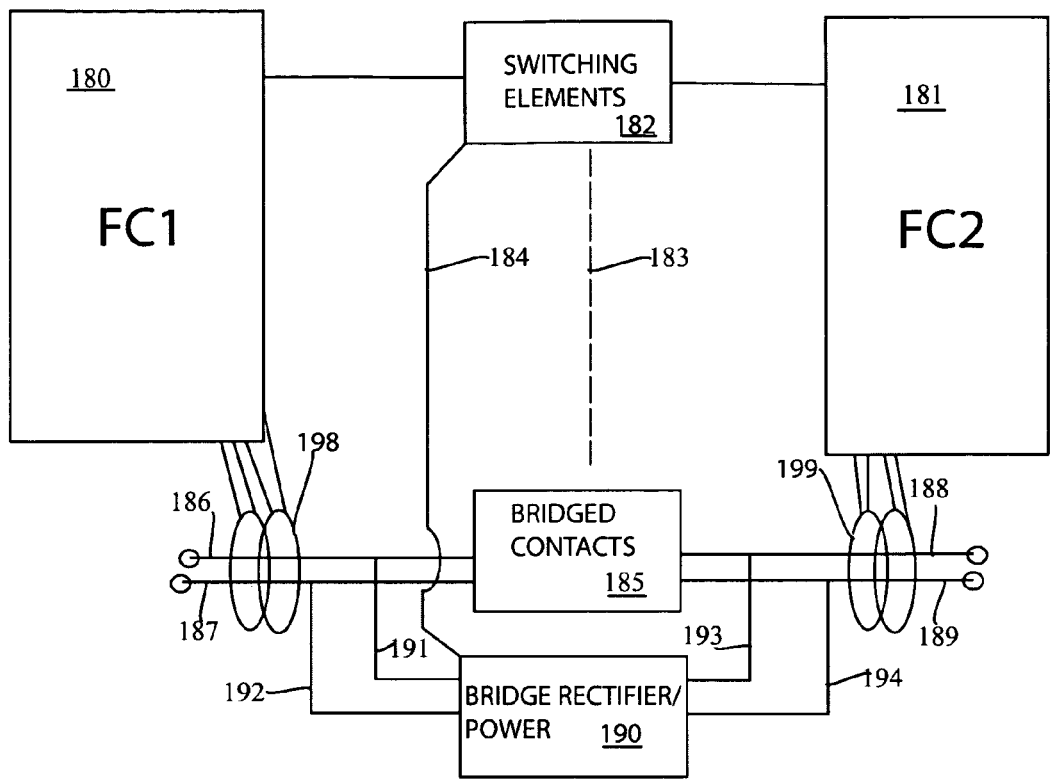
FIG. 19 is a simplified circuit diagram of one embodiment of a fault circuit having symmetrical inputs.

The following drawings refer to multiple different embodiments of a fault circuit interrupter with symmetrical inputs. For example, FIG. 19 shows a simplified circuit diagram including a first fault circuit 180 and a second fault circuit 181 with a plurality of switching elements 182 coupled between them. Coupled to these switching elements is a firing pin or plunger 183 which is actuated by an actuator in a known manner. This plunger is designed to act on at least one of switch or contact 185 such as bridged contacts. While contacts 185 are shown as bridged contacts, any other type of contacts that are known in the art may also be used. These bridged contacts are coupled across phase and neutral lines in the form of a first interface phase line 186, a first interface neutral line 187, a second interface phase line 188 and a second interface neutral line 189. There is also a power source 190 which can be in the form of a bridge rectifier in communication with the terminals for providing power to the switching elements and to the fault circuits. While a bridge rectifier is shown in this example and in the following examples, any other type of power source may also be used as is known in the art. Power source 190 is coupled to the phase and neutral lines via line side phase connection line 191, line side neutral connection line 192, load side phase connection line 193, and load side neutral connection line 194. Power source 190 provides power to these switching elements 182, through line 184 and also to the first fault circuit 180, and the second fault circuit 181. In addition, first fault circuit 180 is coupled across first interface phase line 186 and first interface neutral line 187, via sensors 198 while second fault circuit 181 is coupled across second interface phase line 188 and second interface neutral line 189 as well via sensors 199.

With this design, there is essentially shown a single block of a bridge rectifier circuit 190 which is used to power each of the fault circuits 180 or 181 regardless of how the device is wired. In this case, regardless of how the device is wired, or whether the contacts are set, there is always a primary fault circuit, and a redundant fault circuit which receives power, because bridge rectifier 190 which can be in the form of a single bridge rectifier or two bridge rectifiers, provides power to both sides even when the contacts such as bridged contacts 185 are not set. In this case redundant means that the additional fault circuit is configured to provide redundant fault circuit protection to the components connected to the load terminals, but in at least this embodiment, not the phase terminals. When either one of the fault circuits 180 or 181 read that there is a fault condition, the fault circuit then sends a disconnect signal to switching elements 182 to disconnect contacts 185.

Figure 20:
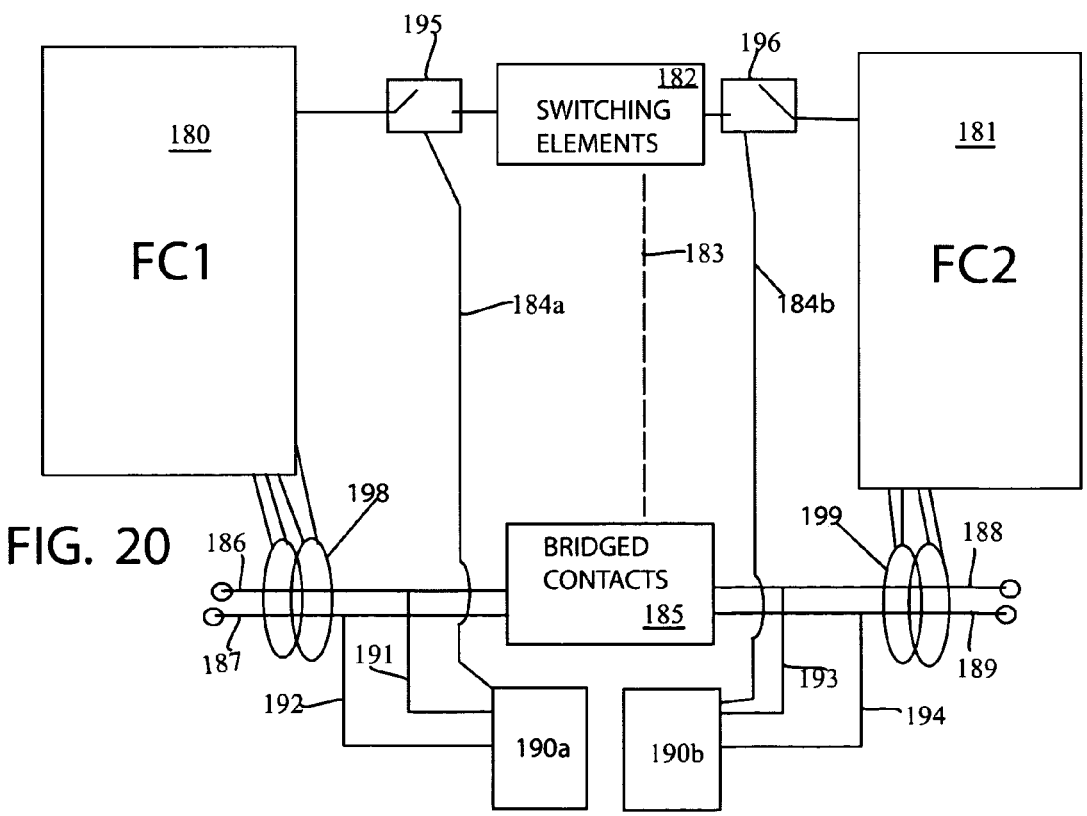
FIG. 20 is a simplified circuit diagram of another embodiment of a fault circuit having additional switches.

FIG. 20 shows a similar layout as shown in FIG. 19 however, there are at least two additional switches coupled on each side of switching elements 182. These switches are for isolating the two fault circuits from each other when the contacts such as bridged contacts 185 are not set. For example there is a first connecting switch 195 coupled between first fault circuit 180 and switching elements 182 and a second connecting switch 196 coupled between second fault circuit 181 and switching elements 182. These two additional switches are for selectively coupling or isolating the fault circuits 180 or 181 respectively, to the switching elements and power from power sources 190a and 190b. For example, switch 195 has an input connected to bridge rectifier/power supply 190a, while switch 196 has an input connected to bridge rectifier/power supply 190b. Switch 195 remains open when it does not receive power or a signal from power supply 190a. Switch 196 remains open when it does not receive power from power supply 190b.

Since power supply 190a and power supply 190b are electrically isolated from each other, if a power cable from a power distribution network is connected to terminals 186 and 187, then power is only supplied to power supply 190a when contacts 185 are in an open position. With this configuration, no power is supplied to power supply 190b and therefore switch 196 remains open thereby isolating fault circuit 181 from fault circuit 180.

However, when these contacts 185 are closed, such as through the pressing of a rest button causing the latching of the contacts, then power is supplied through these contacts to the load side, and power is then provided to power supply 190b. Once power is provided to power supply 190b it is passed to the input of switch 196 switching switch 196 to a closed position to provide power to the second fault circuit 181. It is noted that with the pressing of the reset button, this does not cause continuity of the contacts, only latching causes continuity.

Alternatively, if a power line is coupled to terminals 188, and 189, then, if contacts 185 are open, power is supplied only to power supply 190b, thereby closing switch 196 and providing power to fault circuit 181. Switch 195 remains open thereby isolating fault circuit 180 from fault circuit 181. Once contacts 185 are closed such as through latching of the contacts, power is now supplied to bridge rectifier/power supply 190a. Power is then passed from power supply 190a to switch 195 causing switch 195 to close, thereby providing power to fault circuit 180 creating a redundant fault circuit system.

One benefit of the additional switches is that they can be used to meet further isolation of the line side to the load side. For example, if 1000 volt isolation from input to output is required, the diodes on the bridge rectifiers of the two power supplies may not be suitable to provide sufficient isolation.

In at least one implementation of this embodiment, there is reset lockout circuit such as that disclosed in U.S. Pat. No. 6,040,967 filed on Aug. 24, 1998, the disclosure of which is hereby incorporated herein by reference. With reset lockout circuitry, the device cannot be reset, whereby the contacts latch, unless it passes a self test indicating that a first fault circuit is functional. Therefore, the redundant fault circuit, that which is powered from the load side, remains protected from potentially harmful unusual electrical conditions because it is not connected to power unless the device is reset.

Figure 21:
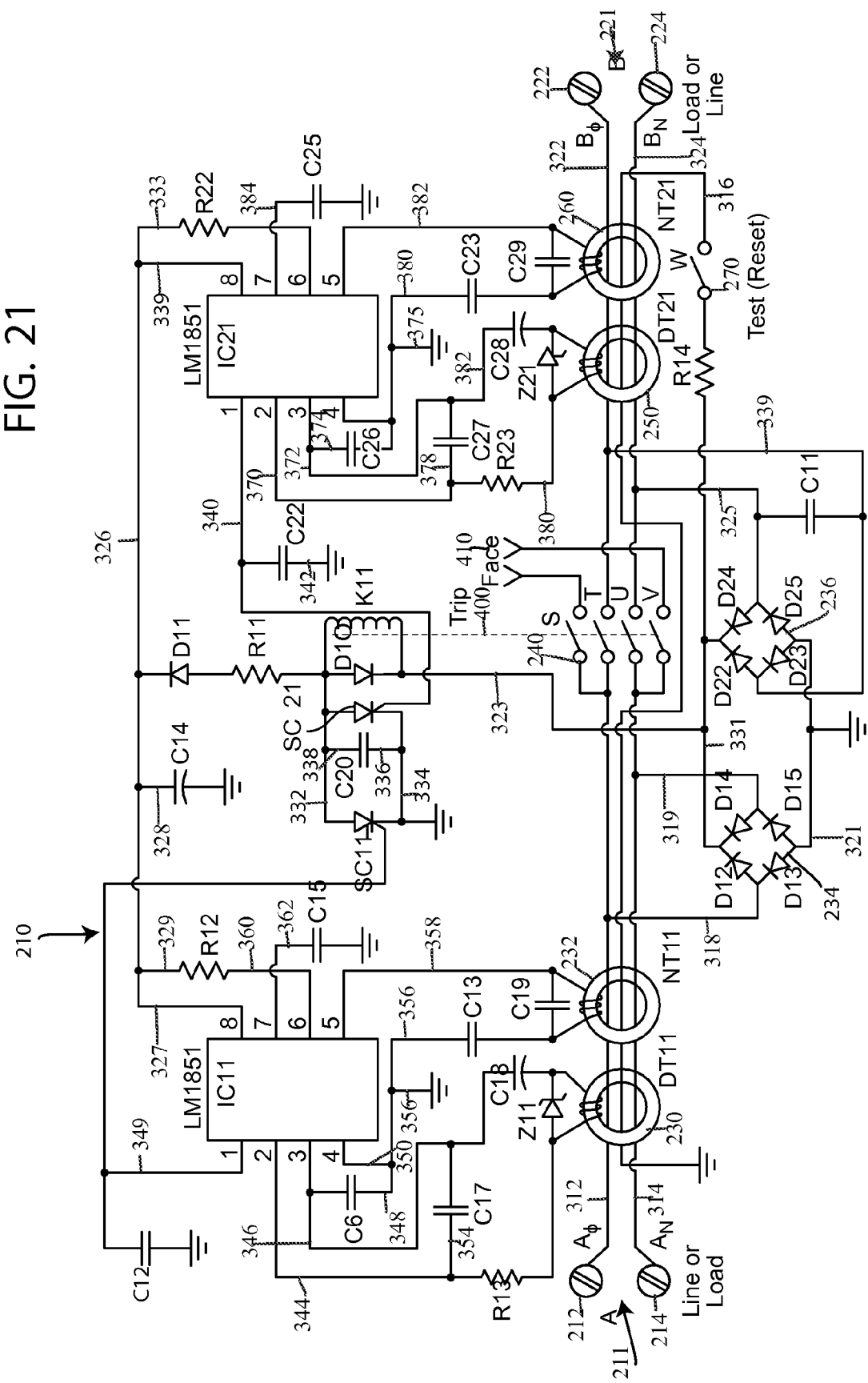
FIG. 21 is a more complex circuit diagram of another embodiment of a fault circuit interrupting device based upon the layout of FIG. 19.
Figure 22:
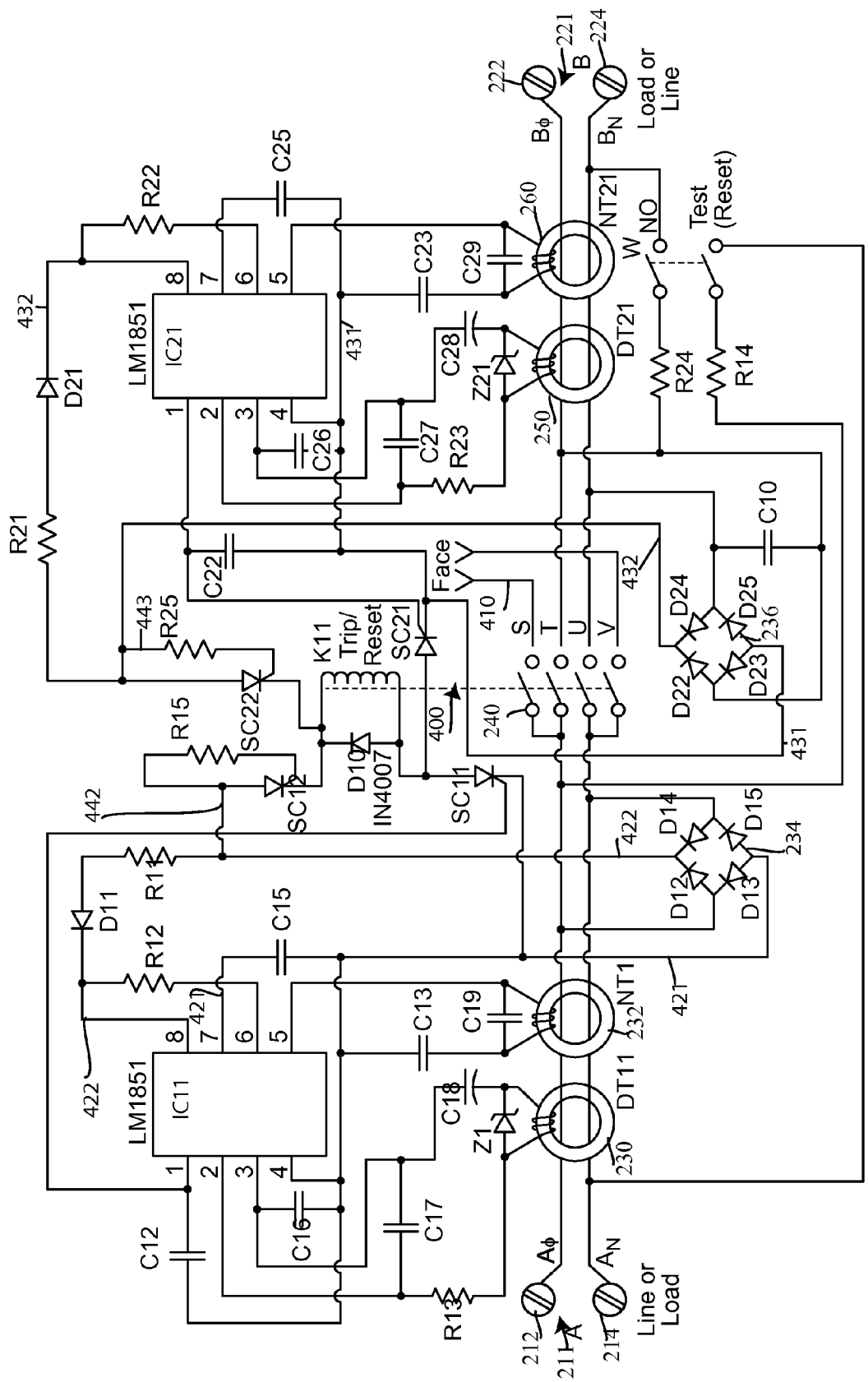
FIG. 22 is a more complex circuit diagram of the fault circuit shown in FIG. 20.

While the design in FIG. 19 can be implemented in any known manner, FIG. 21 shows another embodiment derived from the design of FIG. 19 which is a more complex circuit diagram of the embodiment shown in FIG. 19. Similarly, while the design in FIG. 20 can be implemented in any known manner, FIG. 22 shows another embodiment derived from the design of FIG. 20 which is a more complex circuit diagram of the embodiment shown in FIG. 20.

Thus, turning to FIG. 21, this design shows a circuit interrupting device 210 with symmetrical inputs wherein there are two sets of terminals including a first set 211 and a second set 221. First set of terminals 211 include a phase terminal 212 and a neutral terminal 214. Second set of terminals 221 include a phase terminal 222 and a neutral terminal 224. First set of terminals 211 form a first power connection interface and can be either line or load terminals, while second set of terminals 221 form a second power connection interface and can be either line or load terminals as well. Essentially, if lines of a power distribution network including a phase line and a neutral line are coupled to first set of terminals 211, then this is a line terminal while second terminal set 221, would then be a load terminal set which can then be coupled to wires for a downstream load. Conversely, if second terminal set 221 is coupled to wires of a power distribution network, then first terminal set 211 would be coupled to wires associated with a downstream load.

It is essentially irrelevant which set of terminals 211 or 221 is connected to a line wire and which set of terminals is connected to a load wire for the purposes of this invention, because this invention allows for the correct functioning of a circuit interrupting device regardless of which wires (the load wires or the line wires) are connected to either set of terminals 211 or 221.

Coupled to terminals 212 and 214 are lines 312 and 314 which feed into bridged contacts 240. A plurality of transformers including a differential transformer 230 and a grounded/neutral transformer 232 are coupled along lines 312 and 314 such that these plurality of transformers are adapted to read any current imbalance or fault differential in current between lines 312 and 314. A power source which can be any form of power source known in the art but in this case is a bridge in the form of a bridge rectifier 234 is coupled to lines 312 and 314 via lines 318 and 319 and is thereby fed power from lines 312 and 314. Bridge rectifier 234 includes diodes D12, D13, D14, and D15. Bridge rectifier 234 has an output line 321 coupled to complementary bridge rectifier 236 which is formed from diodes D22, D23, D24, and D25. In addition, line 323 is also coupled between bridge rectifier 234 and complementary bridge rectifier 236. Lines 339, and 325 are coupled to bridge rectifier 236 from lines 322 and 324 respectively.

Lines 322 and 324 are coupled to the second set of terminals 221 including phase terminal 222 and neutral terminal 224. When second terminal set 221 is wired to a power distribution network, these lines 322 and 324 thereby feed power into bridge rectifier 236 via phase line 322 and neutral line 324 feeding power into lines 325 and 339 into bridge rectifier 236. Therefore, if terminal set 211 is wired to a power distribution network, then bridge rectifier 234 provides power through line 323 to two different integrated circuits IC11 and IC21 by feeding power through K11 R11, and D11 into pins 6 and 8 of these respective integrated circuits. While integrated circuits such as circuits IC11 and IC21 are shown, any other type of circuitry that could be used to perform the same function can be used such as a microprocessor. More particularly, IC11 and IC21 are also known as control circuits which are selected from the group consisting of integrated circuits, microprocessors, and microcontrollers.

Alternatively, if terminal set 221 is wired to a power distribution network, bridge rectifier 236 receives power and then powers bridge 234 as well as sending power through line 323 to power IC11 and IC21 through inputs or pin 6 and 8 of each of these integrated circuits.

In addition, disposed along lines 322 and 324 are a plurality of transformers in the form of a differential transformer 250 and a grounded/neutral transformer 260. A signal ground line 316 which is coupled to reset button 270 also extends parallel to lines 322 and 324. When there is no ground fault, current flowing through lines 312 and 314 is balanced. However, during ground faults, or during the introduction of current into line 326, this creates an imbalance.

For example, signal ground line 316 receives power from either bridge rectifier 234 or 236 through resistor R14 when reset button 270 is pressed. Therefore, when reset button 270 is pressed, it closes the circuit for ground line 316 thereby causing current to flow through line 316 which is a different current than that flowing through either lines 312, 314 or 322 or 324 creating a simulated ground fault passing through transformers 230, 232, and transformers 250 and 260 for the purpose of testing, and then subsequently resetting the circuit. When reset button 270 is pressed, solenoid K11 activates, opening a latching mechanism due to the mechanics of this test/reset button 270 which are further described in U.S. Pat. No. 6,040,967 to Disalvo which issued on Mar. 21, 2000, the disclosures of which are hereby incorporated herein by reference. Thus, contacts 240 are reset before reset button 270 is fully released.

While the above disclosure uses the example of bridge contacts, bridge contacts are only one type of contacts while other types of contacts can also be used.

Power from bridge rectifiers 234 and 236 is passed through line 323 input into lines 326 and 327 to power integrated circuits IC11 and IC21. Power from line 327 is input into pin 8 of IC11 and also split with line 329 feeding into pin 6 of IC11 as well. Power from line 339 is input into pin 8 of IC21 and also split with line 333 feeding into pin 6 of IC 21 as well.

Line 323 has diode D10, which along with coil K11 forms a transient suppressor diode across coil K11. In this case, resistor R11 and diode D11 coupled in series along this line as well and are used to isolate the integrated circuits IC11 and IC21 from coil K11, so that when power is cut off, capacitor C14 provides short term power to IC11 and IC21 to make sure that SCR11 and SCR21 trip.

In addition, resistors R12 and R22 are present in lines 329 and 333 respectively to set the voltage into integrated circuits IC11 and IC21. Thus, pin 6 and resistor R12 are set for the threshold voltage for the ground fault level.

IC11 and IC21 are essentially identical integrated circuits which can be for example LM1851 circuits. These fault circuits are coupled on each side of the circuit wherein based upon this layout IC11 is coupled to bridge contacts 240 while IC21 is coupled on the opposite side of bridge contacts 240. Thus, IC11 and IC21 are electrically isolated from each other when bridge contacts 240 are open and electrically connected to each other when bridge contacts 240 are closed.

IC11 has eight pins. Pin 1 serves as an output pin to selectively activate SCR SC11 via line 349 by presenting an input voltage into gate SC11G thereby selectively opening SCR SC11. Pins 2 and 3 are electrically coupled to lines 344 and 346 which are coupled to differential transformer 230. Line 344 has resistor R13 coupled therein and line 346 has capacitor C18 coupled therein. In addition, line 354 has a capacitor C17 coupled across these lines, while zener diode Z11 is also coupled across these lines. Pins 2 and 3 are designed to receive a reading of a signal from differential transformer 230 created by a current imbalance in any one of lines 312, 314, or 316 passing through differential transformer 230. This reading is regulated by the resistors, capacitors, and zener diode discussed above in this paragraph.

Pins 4 and 5 are coupled to lines 356 and 358 which are coupled to grounded/neutral transformer 232. Line 356 has coupled therein capacitor C13 while line 358 is coupled directly into pin 5. Coupled between lines 356 and 358 is a capacitor C19. Pins 4 and 5 are designed to receive a reading of a signal from grounded/neutral transformer 232 wherein this signal is regulated by capacitors C13, C16 and C19 coupled along these lines.

As discussed above, pins 6 and 8 are for receiving power from either one of bridge rectifiers 234 or 236 while pin 7 is coupled to capacitor C15 which is coupled along line 362 which is coupled to ground. Capacitor C15 is in the form of a timing capacitor which regulates the time that a fault condition occurs before IC11 instructs pin 1 to "go high" which essentially results in pin 1 having a voltage sufficiently high to trigger SCR SC11.

Similarly, integrated circuit IC21 has pins 1-8 which operate in a similar manner. For example, pin 1 is used to activate SCR SC21 by passing a voltage along line 340. In addition, pins 2 and 3 are coupled to lines 370 and 372 and lines 380 and 382 which are coupled to differential transformer 250. Coupled along these lines are capacitors C26, C27, C28, and zener diode Z21 which are used to regulate the signal input into IC21 from differential transformer 250 to indicate the presence of a fault.

Pins 4 and 5 are coupled to grounded/neutral transformer 260 and are designed to receive a signal sent from grounded/neutral transformer 260 to indicate a ground fault. As discussed above, pins 6 and 8 are for receiving power from power supply/bridge rectifiers 234 and 236. Pin 7 is coupled to line 384 which includes capacitor C25 which as disclosed above regarding capacitor C 5, this capacitor can be in the form of a timing capacitor.

Silicon controlled rectifiers SC11 and SC21 serve as switches to selectively control whether current flows through coil K11 to control whether pin 400 trips contacts 240. The opening and closing of SCR11 is controlled by IC11 which selectively sends a signal in the form of a voltage from pin 1 into a gate SCR11G of SCR11. The opening and closing of SCR21 is controlled by IC21 which selectively sends a signal in the form of a voltage from pin 1 of IC21 into gate SCR21G of SCR21. The sending of this signal or voltage out from pin 1 of IC11 occurs when IC11 determines there is the presence of a fault. The sending of this signal or voltage out from pin 1 of IC21 occurs when IC21 determines there is the presence of a fault. By opening up either SC11 or SC21 current flows through coil K11 thereby creating an inductance which causes pin 400 to fire causing contacts 240 to trip.

Thus, with this design if a power distribution network has lines that are coupled to terminals 212 and 214 of terminal set 211 then bridge rectifier 234 and thus, IC11 is powered, and set active to determine whether there is the presence of a fault in lines 312, 314 or 316 via transformers 230 and 232. When bridge contacts 240 are closed, by pressing test/reset button 270 causing latching, this closes the circuit allowing power to flow into bridge rectifier 236, and also powering IC21 creating a redundant fault circuit which can also read whether there is a fault via differential transformer 250 or grounded/neutral transformer 260. Thus, with contacts 240 being closed there is essentially a redundant fault circuit system that is operational. Thus, there are essentially two fault circuits with a first fault circuit being formed by differential transformer 230, grounded/neutral transformer 232 and integrated circuit IC11. The second fault circuit is thus formed by differential transformer 250, grounded/neutral transformer 260 and integrated circuit IC21. Either fault circuit can operate as a redundant, or fail/safe fault circuit for the other when contacts 240 are closed. Thus, regardless of which terminal set is coupled to a power distribution network, if the contacts are closed, either fault circuit can operate as a primary fault circuit with the other fault circuit acting as a redundant or backup fault circuit if the primary fault circuit fails.

Alternatively, if a fault circuit interrupter is first coupled to a power distribution network via terminal set 221, then with contacts 240 initially open, power is supplied to bridge rectifier 236 and then onto integrated circuit IC21. At this point, the second fault circuit comprising IC21, differential transformer 250 and grounded/neutral transformer 260 is operational and set to determine whether there is a fault present. With the closing of contacts 240, power is passed to bridge rectifier 234 and the first fault circuit becomes operational as well. Thus, regardless of how a device is wired, there is fault circuit protection for face contacts 410.

This design, of FIG. 21 is similar to the design of FIG. 19 in that with FIG. 19 fault circuit 180 is represented by a plurality of components comprising an integrated circuit, such as IC11 a differential transformer such as DT11, a neutral transformer such as NT11 and their connecting components or connecting lines. The switching elements 182 shown in FIG. 1 can include switches or SCRs such as SC11 and SC21 shown in FIG. 21. In addition, bridge rectifier/power supply 190 can comprise bridge rectifiers 234 and 236 and their connecting components or associated connecting lines. Furthermore, contacts 185 can comprise contacts such as contacts 240.

FIG. 22 discloses a modified version as shown in FIG. 21. In this view, there are four silicon controlled rectifiers SC11, SC12, SC21 and SC22 instead of just two silicon controlled rectifiers. These two additional silicon controlled rectifiers SC12 and SC22 provide the benefit of allowing the two fault circuits to be isolated from each other from input to output. In addition, these two switches further isolate the line side from the load side. In this case, bridge rectifiers 234 and 236 are not directly connected to each other. For example, when power is supplied to first terminal set 211, SCR SC12 is only open, allowing power to flow through, when first bridge rectifier 234 receives power. This occurs by power flowing from bridge rectifier 234 through line 421 to pin 7 of IC11 and through line 422 to pin 8 of IC11. In addition, along line 433 is resistor R22 wherein this line feeds into pin 6 of IC21. As stated above, resistor R22 sets the voltage into IC21. Power flowing through line 422 also flows into line 442 opening up SCR SC12.

However, if bridge contacts 240 are not latched, then SCR SC22 is now open thereby isolating the electronic components represented substantially on the right side of this diagram. SCR SC22 is only powered when bridge rectifier 236 provides power to the gate of SCR SC22. This opens SCR SC22 to provide power to the components disposed substantially on the right side of this diagram. Bridge rectifier 236 only has power when a power line is coupled to input 221 or when power is supplied to input 211 and bridged contacts 240 are closed, thereby bridging power across both sides of the circuit.

Conversely, when power is applied to terminal set 221, bridge rectifier 236 is initially powered, while bridge rectifier 234 is dormant provided bridge contacts 240 are open. If bridged contacts 240 are latched, then power is provided to bridge rectifier 234 as well. In this case, if bridged contacts 240 are open, then SCR SC12 would serve to isolate power from the components represented or shown substantially on the left side of this diagram. This is because SCR SC12 is closed, creating an open circuit. When power is applied to terminal end 221, power is applied to bridge rectifier 236, with power flowing through line 431 to pin 7 of IC21. With power flowing through line 432, it also branches off to line 443 providing power to the gate of SCR SC22 opening SCR SC22 to create a closed circuit.

Only when power is fed to bridge rectifier 234 is the gate of SCR SC12 opened, thereby allowing power to flow into these components represented on the left hand side of this diagram.

Thus these two additional SCRs function as isolating components or an isolating means with SCR SC12 isolating the components represented substantially on the left of this diagram, with SCR SC22 isolating components represented substantially on the right hand side of this diagram.

Similarly, as discussed above, FIG. 20 shows additional switches 195 and 196 which can correspond to SC12 and SC22 as well. While in these embodiments the switching components or switching means are disclosed as silicon controlled rectifiers, other types of switches that are known in the art can also be used to act as switches as well.

FIGS. 23A, 23B and 23C are flow charts for the process for connecting and providing against a miswiring condition. In this case, FIG. 23A represents the process for the embodiments of FIGS. 8 and 8A. With this design, step S1 involves connecting power to the receptacle. Next, in step S2 the power source is detected such that the power can be either connected to an "A" connection or to a "B" connection. Depending on which connection is connected to power, the device in step S3 would switch to connect the fault circuit to the proper power source to prevent a miswiring condition. This switching would occur via power flowing through either coil 114 or coil 116 to cause the contacts to latch. For example, when power is connected to the "A" connection end, power flows through coil 114 causing the contacts to latch in a first position. When power is connected to the "B" connection end, power flows through coil 116 causing the contacts to latch in the other direction.

FIG. 23B shows the process for connecting the device associated with FIGS. 19 and 21. With this design, power is connected to either terminal set 211 or 221 in step S1. Next, the power source is detected by the fault circuit in step S2. With this design, since the power supplies 190 or 234, and 236 are directly coupled together, this provides redundant protection to any device connected downstream of a load contact such as a load contact coupled to either terminal set 221 or to terminal set 211. Next, the contacts are latched, which allows for power to flow from the line side to the load side to set the fault circuit into an operational mode. With this design, because there is fault circuit protection on both sides of the contacts 240, the condition where there is no fault circuit protection due to miswiring is prevented.

FIG. 23C shows the process for the devices shown in FIGS. 20 and 22. In this case, step S1 involves connecting power such as to terminals 186, and 187 on one side or to terminals 188 and 189 on the opposite side as shown in FIG. 20, or to terminal set 211 on one side or terminal set 221 on the other side. Next, in step S2, the power source is detected so that power flows through from either one side or the other into the internal components. Next, in step S5 the contacts are latched. As described above, the contacts can be latched when the reset button is pushed and when released, the contacts are pulled together to latch. Next, in step S6 once the contacts are latched, power flows from one side of the device to the other, thereby causing switches such as switch SCR12 or SCR 22 to close, causing power to flow from one side of the device to the other side of the device.

Next, once the contacts are latched, power flows from the first side to the other side allowing for redundant load side ground fault protection. It is noted that the term "redundant" does not apply to redundant protection on the face terminals. The device connected to the face terminals is only protected by a single fault circuit.

Accordingly, while only a few embodiments of the present invention have been shown and described, it is obvious that many changes and modifications may be made thereunto without departing from the spirit and scope of the invention.

What is claimed is:

1. A circuit interrupting device with at least two inputs comprising:
   a) a first input configured for connection to a power source or a load circuit;
   b) a second input configured for connection to a power source or a load circuit;
   c) a first fault circuit coupled to said first input comprising:
      i) a first grounded neutral transformer;
      ii) a first integrated circuit configured to determine the presence of a fault;
   d) a second fault circuit coupled to said second input comprising:
      i) a second grounded neutral transformer;
      ii) a second integrated circuit configured to determine the presence of a fault;
   e) at least one switch coupled to at least one of said first fault circuit and said second fault circuit;
   f) a first terminal set coupled to said first input and a second terminal set coupled to said second input;
   g) at least one disconnect circuit coupled to said at least one switch, said at least one disconnect circuit configured to selectively electrically disconnect said first input from said second input upon receiving a disconnect signal from said at least one switch and wherein said first integrated circuit is coupled to said first terminal set, and wherein said second integrated circuit is coupled to said second terminal set.

2. The fault circuit interrupting device as in claim 1, wherein a) said first input comprises said first set of terminals comprising at least two terminals which comprises a phase terminal and a neutral terminal and wherein the power source is connected to the first set of terminals; and b) said second input comprises said second set of comprising at least two terminals which comprise a phase terminal and a neutral terminal and wherein the load circuit is connected to the second set of terminals and wherein the device further comprises a first bridge rectifier, in electrical communication with said first set of terminals, and a second bridge rectifier, in electrical communication with said second set of terminals.

3. The fault circuit interrupter as in claim 2, wherein said first bridge rectifier and said second bridge rectifier are in electrical communication with each other so that when said first bridge rectifier receives power, it passes power to said second bridge rectifier.

4. The fault circuit interrupter as in claim 2, wherein said first bridge rectifier and said second bridge rectifier are selectively electrically isolated from each other by at least one switch.

5. The fault circuit interrupting device of claim 1, wherein said at least one switch comprises at least two switches with a first switch coupled to said first fault circuit and a second switch coupled to said second fault circuit.

6. The fault circuit interrupting device as in claim 5, wherein said first switch and said second switch are silicon controlled rectifiers, and wherein the device further comprises at least one isolating switch wherein said at least one isolating switch is configured to isolate said first input from said second input.

7. The fault circuit as in claim 6, wherein said at least one isolating switch comprises at least one first isolating switch and at least one second isolating switch, wherein said first isolating switch is coupled to said first fault circuit, and said second isolating switch is coupled to said second fault circuit.

8. The fault circuit as in claim 7, wherein said at least one first isolating switch is a silicon controlled rectifier and said at least second isolating switch is a silicon controlled rectifier wherein said at least one first isolating switch is coupled to said first power supply, and said at least one second isolating switch is coupled to said second power supply, wherein said first power supply is coupled to said first input, and said second power supply is coupled to said second input.

9. The fault circuit interrupter as in claim 7, wherein said second integrated circuit is a redundant integrated circuit to said first integrated circuit.

10. The fault circuit interrupter as in claim 7, wherein said first integrated circuit is a redundant integrated circuit to said second integrated circuit.

11. The fault circuit interrupting device as in claim 1, wherein said first integrated circuit comprises at least one first of a microprocessor or a microcontroller.

12. The fault circuit interrupting device as in claim 11, wherein said second integrated circuit of said second fault circuit comprises at least one of, a microprocessor or a microcontroller.

13. The fault circuit interrupter as in claim 11, wherein said at least one switch comprises at least two switches comprising at least one first switch and at least one second switch wherein said at least one first switch is in communication with said at least one first integrated circuit disposed to selectively open a group of contacts when said first switch receives a disconnect signal from said at least one first integrated circuit, and wherein said at least one second switch is in communication with said at least one second integrated circuit for selectively opening a set of contacts after receiving a disconnect signal from said at least one second integrated circuit.

14. The fault circuit interrupter as in claim 11, further comprising at least one first isolating switch and at least one second isolating switch, wherein said at least one first isolating switch is electrically coupled to said at least one first integrated circuit and is configured to selectively isolate said at least one first integrated circuit from power, and wherein said at least one second isolating switch is coupled to said at least one second integrated circuit and is configured to selectively isolate said at least one second integrated circuit from power.

15. The fault circuit interrupter as in claim 14, further comprising at least one first power supply coupled to said first input and at least one second power supply coupled to said second input, wherein said first isolating switch is coupled to said at least one first power supply, and wherein said second isolating switch is coupled to said at least one second power supply.

16. A fault circuit interrupting device with symmetrical inputs including a first power connection interface and a second power connection interface, the device comprising:
   a) a housing;
   b) a first fault circuit disposed in said housing comprising at least one first integrated circuit;
   c) a second fault circuit disposed in said housing and comprising at least one second integrated circuit;
   d) at least one switch coupled between said first fault circuit and said second fault circuit, wherein said at least one switch is for switching between said first fault circuit and said second fault circuit depending on whether a power line is coupled to the first power connection interface or the second power connection interface.

17. The fault circuit as in claim 16, wherein said first integrated circuit comprises at least one of a microprocessor or a microcontroller, and said second integrated circuit comprises at least one of a microprocessor, or a microcontroller.

* * * * *

UNITED STATES PATENT AND TRADEMARK OFFICE
CERTIFICATE OF CORRECTION

| | | |
|---|---|---|
| PATENT NO. | : 8,139,328 B2 | Page 1 of 1 |
| APPLICATION NO. | : 12/275869 | |
| DATED | : March 20, 2012 | |
| INVENTOR(S) | : Di Salvo et al. | |

It is certified that error appears in the above-identified patent and that said Letters Patent is hereby corrected as shown below:

On the cover page, column 1, item [73], the name of the assignee should read:
-- Leviton Manufacturing Company, Inc. --

Signed and Sealed this
Eighteenth Day of December, 2012

David J. Kappos
*Director of the United States Patent and Trademark Office*